United States Patent Office 3,709,874
Patented Jan. 9, 1973

3,709,874
1-β-D-ARABINOFURANOSYL CYTOSINE DERIVATIVES AND METHODS OF PREPARING
John G. Moffatt, Los Altos, and Alan F. Russell, San Francisco, Calif., assignors to Syntex Corporation, Panama, Panama
No Drawing. Filed Mar. 19, 1970, Ser. No. 21,206
Int. Cl. C07d 51/52
U.S. Cl. 260—211.5 R          30 Claims

ABSTRACT OF THE DISCLOSURE 2,2'-anhydro-1-(3'-O-acyl - β - D - arabinofuranosyl) cytosine salt derivatives; (S) 2,2'-anhydro-1-(3'-O-acyl-β-D-arabinofuranosyl) - 2 - thiocytosine salt derivatives; 1-(β-D-arabinofuranosyl) - 5 - azacytosine derivatives and 1-(2'-thio-β-D-arabinofuranosyl) cytosine and methods of preparing such compounds and converting the aforementioned 2,2'-anhydro derivatives to the corresponding 1-β-D-arabinofuranosyl cytosine derivatives. The 2,2'-anhydro-1-(3'-O-acyl-β-D-arabinofuranosyl) cytosine and (S) 2,2' - anhydro - 1 - (3'-O-acyl-β-D-arabinofuranosyl)-2-thiocytosine derivatives are prepared by treating the corresponding cytosine ribonucleosides with a suitable α-acyloxy acid halide. Other pharmaceutically acceptable salts can be prepared by ion exchange. Treatment of these derivatives with an aqueous alkaline solution affords the corresponding 1-(β-D-arabinofuranosyl) cytosine nucleosides. The 2,2'-anhydro-1-(3'-O-acyl-β-D-arabinofuranosyl) cytosine; (S) 2,2'-anhydro-1-(3'-O-acyl-β-D-arabinofuranosyl)-2-thiocytosine and 1-(β-D-arabinofuranosyl)-5-azacytosine derivatives and 1-(2'-thio-β-D-arabinofuranosyl) cytosine exhibit antiviral and cytotoxic activity, and the 2,2'-anhydro derivatives are further useful as intermediates for the preparation of 1-(β-D-arabinofuranosyl) cytosines which also have utility as antiviral and cytotoxic agents.

BACKGROUND OF THE INVENTION (1) Field of the invention

This invention relates to arabinofuranosyl compounds and to methods of making and using such compounds. In a further aspect, this invention relates to 2,2'-anhydro-1-(3'-O-acyl-β-D-arabinofuranosyl) cytosine and (S) 2,2'-anhydro-1-(3' - O-acyl-β-D-arabinofuranosyl)-2-thiocytosine halide salt derivatives, and pharmaceutically acceptable salts thereof, and to methods of preparing and using such compounds. In a still further aspect, this invention relates to 1-(β-D-arabinofuranosyl)-5-azacytosine derivatives and 1-(2'-thio-β-D-arabinofuranosyl) cytosine, and pharmaceutically acceptable salts thereof, and to methods of preparing and using such compounds. In another aspect this invention relates to methods of preparing 1-(β-D-arabinofuranosyl) cytosine compounds.

(2) The prior art

Since the recognition of the anti-viral and cytoxic properties of 1-β-D-arabinofuranosyl cytosine, this compound has been the subject of much study, especially as regards to obtaining a more felicitous method for its preparation. One prior art method of preparing this compound is via a three-step process comprising: (1) treating cytidine with polyphosphoric acid to yield a 3',5'-diphosphate of 2,2'-anhydro-1-(β-D-arabinofuranosyl) cytosine; (2) dephosphorylating this product using prostatic phosphatase to yield a chloride salt of 2,2'-anhydro - 1 - (β-D-arabinofuranosyl) cytosine; and (3) converting this product to 1-β-D-arabinofuranosyl cytosine by alkali hydrolysis (note Walwick et al., Proc. Chem. Soc., 84 (1959). Accordingly, we have discovered a simplified two-step process which produces a novel 2,2'-anhydro-1-(3'-O-acyl-β-D-arabinofuranosyl) cytosine halide salt as an intermediate, which can then be converted to 1-(β-D-arabinofuranosyl) cytosine by alkali hydrolysis as the second step of our process. We have further discovered that the novel 2,2'-anhydro-1-(3'-O-acyl-β-D-arabinofuranosyl) cytosine halide salt intermediate also per se exhibit antiviral and cytotoxic activity in their own right as well as via possible intracellular hydrolysis to the corresponding arabinoside. We have also found that because of the physical properties and chemical stabilities of cyclonucleosides, that these 3'-O-acyl derivatives cannot be readily prepared from the parent 2',2'-anhydro compound, even though they are readily prepared according to the process of our invention.

We have also accordingly discovered novel (S) 2,2'-anhydro-1-(3' - O-acyl-β-D-arabinofuranosyl)-2-thiocytosine; 1-(β-D-arabinofuranosyl)-5-azacytosine; and 1-(2'-thio-β-D-arabinofuranosyl) cytosine compounds which have utility as antiviral and cytotoxic agents and which can be prepared by our simplified procedure.

SUMMARY OF THE INVENTION

In summary, the cyclocytidine compounds of our invention can be represented by the following formula:

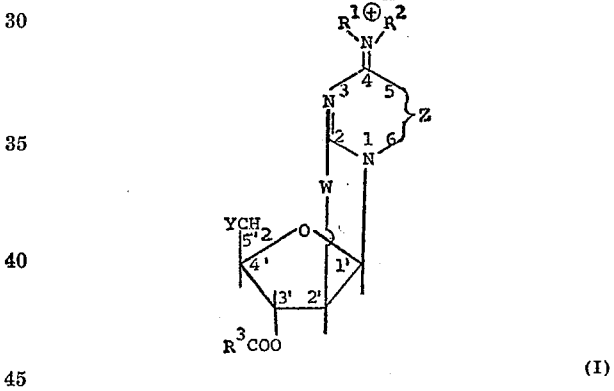

(I)

wherein $R^1$ and $R^2$ are independently selected from the group H, lower alkyl, aryl or lower alkylaryl; $R^3$ is lower alkyl, aryl, lower alkylaryl, cycloalkyl or heterocyclic; X is halo or other pharmaceutically acceptable anion; Y is H, hydroxy, halo, lower acyloxy, ether, (such as, and preferably benzyloxy), amino, lower alkylamino, or azido and preferably is H, hydroxy, halo, lower alkoxy, amino, lower alkylamino or azido; Z is the group

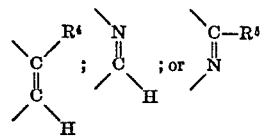

wherein $R^4$ is H, halo, lower alkyl, lower hydroxyalkyl, lower alkylhalide, azido, nitro, amino, lower alkylamino, or acylamido; and $R_5$ is H or methyl; and wherein when Z is

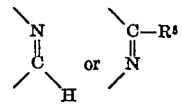

Y is hydroxy, chloro or bromo, and $R^1$ and $R^2$ are independently H or lower alkyl; and W is oxa or thia, and wherein when W is thia, $R^1$ and $R^2$ are H, Y is hydroxy and Z is

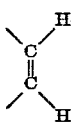

In summary, the 1 - ($\beta$-D-arabinofuranosyl)-5-azacytosine compounds and 1 - (2' - thio-$\beta$-D-arabinofuranosyl) cytosine compounds of our invention can be represented by the following generic formula:

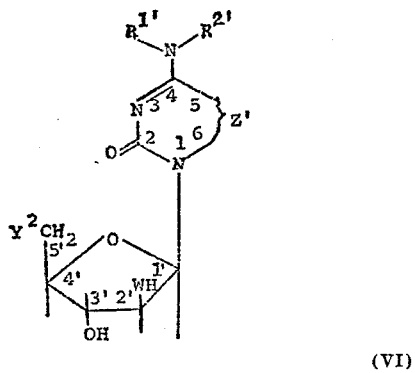

(VI)

wherein $R^{1'}$ and $R^{2'}$ are independently selected from the group H or lower alkyl; $Y^2$ is hydroxy, chloro or bromo; Z' is the group

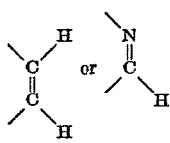

and W is the group oxa or thia and wherein when W is thia, Y is hydroxy; Z' is

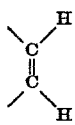

and $R^{1'}$ and $R^{2'}$ are H, and wherein when W is oxa, Z' is

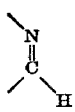

Also encompassed by our invention are the pharmaceutically acceptable salts of the above parent compound.

In summary, the process, according to our invention of preparing the chloride, bromide, and iodide salt compounds of Formula I, comprises treating the corresponding cytosine ribonucleosides or suitable derivatives thereof with a suitable $\alpha$-acyloxy acid halide. The resulting products of Formula I can be separated and further purified by any suitable method such as, for example, liquid-liquid extraction, chromatography, and/or crystallization, and used as antiviral or cytotoxic agents, etc., or they can be used as intermediates for preparing arabinofuranosyl cytosine derivatives according to our process. The fluoride salt compounds, and preferably also the iodide salt compounds, of Formula I are prepared from the corresponding chloride or bromide salt compounds of Formula I by ion exchange with the desired fluoride or iodide ion. Similarly, other pharmaceutically acceptable salts can also be prepared by ion exchange with the particular desired pharmaceutically acceptable ion. The compounds of Formula I can be converted to the corresponding arabinofuranosyl compounds via alkaline hydrolysis by treatment with a suitable basic solution. This treatment can be effected either with or without separation or isolation of the products of Formula I from the reaction mass. The compound of Formula VI, of our invention, is thus also prepared in this manner. Pharmaceutically acceptable salts of Formula VI, of our invention, can be prepared by treatment of the parent compound of Formula VI with an acid of the particular pharmaceutically acceptable salt desired.

A further discussion of our invention is given hereinbelow, wherein, for purposes of simplicity, the 2,2'-anhydro - 1 - ($\beta$-D-arabinofuranosyl) cytosine derivatives have been referred to by their cyclocytidine trivial names.

DETAILED DESCRIPTION OF THE INVENTION AND PREFERRED EMBODIMENTS

The cyclocytidine compounds of our invention can be represented by the following sub-generic formulas:

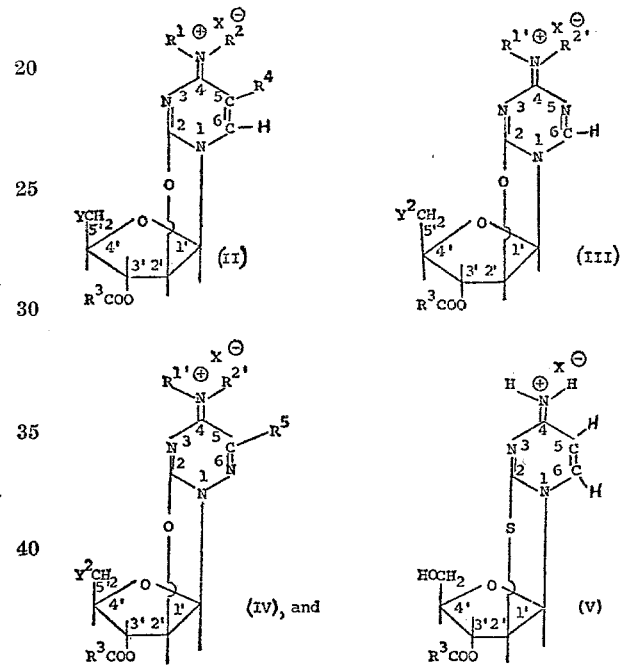

wherein $R^1$ and $R^2$ are independently selected from the group H, lower alkyl, aryl or lower alkylaryl; $R^3$ is lower alkyl, aryl, lower alkylaryl, cycloalkyl or heterocyclic; X is halo or other pharmaceutically acceptable anion; Y is H, hydroxy, halo, ether group (such as, and preferably, benzyloxy), lower acyloxy, amino, lower alkylamino, or $N_3$; $Y^2$ is hydroxy, chloro or bromo; $R^4$ is H, halo, lower alkyl, lower hydroxyalkyl, lower alkylhalide, azido, nitro, amino, lower alkylamino, or acylamido; $R^5$ is H or methyl; and $R^{1'}$ and $R^{2'}$ are independently selected from the group of H and lower alkyl.

The 1-($\beta$ - D - arabinofuranosyl)-5-azacytosine compounds of our invention can be represented by the formulas:

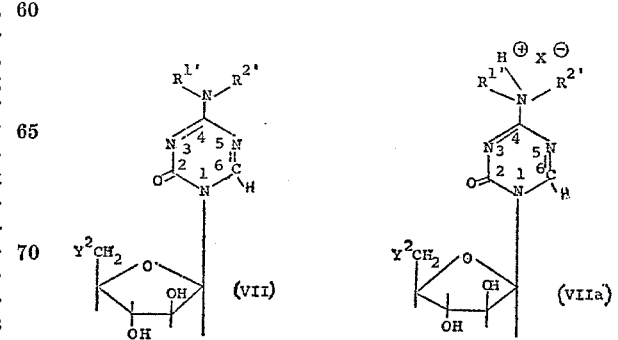

wherein $R^{1'}$, $R^{2'}$, X and $Y^2$ are as defined hereinabove.

The 1-(2'-thio-β-D-arabinofuranosyl) cytosine compounds of our invention can be represented by the following formulas:

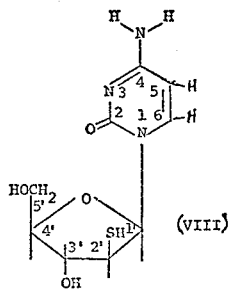 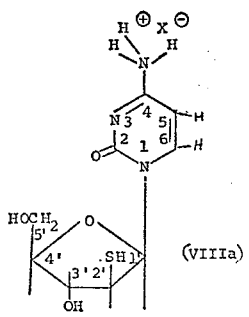

where X is halo or other pharmaceutically acceptable anion.

As used hereinabove and below, the following terms have the following meanings. The term lower alkyl refers to alkyl groups having about from 1 through 20 carbon atoms and includes both straight and branched chain groups and cyclic groups. The term aryl refers to groups containing an aromatic ring such as, for example, phenyl, and having about from 6 to 15 carbon atoms. The term aryloxy refers to ether groups having at least one aryl substituent. The term heterocyclic refers to both saturated and unsaturated cyclic compounds containing one or more non-carbon ring atoms; e.g. oxygen and/or nitrogen and/or sulfur, having 3 to 10 ring atoms. Typical heterocyclic groups include, for example, thionyl; pyrrolyl; furyl; pyrazolyl; furazanyl; isothiazolyl; indolyl and the like. The term lower alkylaryl refers to groups having an aromatic ring containing 1 or more lower alkyl substituents and having a total (ring+alkyl) of 6 to 30 carbon atoms. Attachment of the alkylaryl group to the nucleoside group can be via the arylnucleus or via attachment to the alkyl substituents. The term lower alkylhalo group refers to lower alkyls having one or more halo substituents. The term lower hydroxyalkyl refers to lower alkyls having one or more hydroxy substituents. The term halo refers to fluoro, chloro, bromo, and iodo. The term ether and lower acyloxy, respectively, refer to those ether and ester groups conventionally employed in the nucleoside-nucleotide art, preferably having about from 1 to 12 carbon atoms. Typical ether groups include, for example, the group RO wherein R is, for example, methyl, trityl, benzyl, tetrahydropyranyl and the like. The preferred ether group is benzoyloxy. Typical ester groups (i.e. RCO in RCOO·) include, for example, acetyl, chloroacetyl, butyryl, hexanoyl, benzoyl and the like. The term pharmaceutically acceptable anion refers to pharmaceutically acceptable anions conventionally used in the pharmaceutical art such as, for example, derived from inorganic or organic acids, such as, for example, hydrofluoric, hydrochloric, hydrobromic, hydroiodic, sulfuric, phosphoric, lactic, benzoic, acetic, propionic, maleic, malic, tartaric, citric, succinic, ascorbic; acids and the like. Preferred pharmaceutically acceptable anions include bromide, chloride, sulfate, phosphate, acetate, lactate and the like.

Typical compounds represented by Formula II include, for example,

3'-O-acetyl-O²,2'-cyclocytidine hydrochloride;
3'-O-butyryl-5-fluoro-O²,2'-cyclocytidine hydrochloride;
5'-deoxy-3'-O-propionyl-O²,2'-cyclocytidine hydrobromide;
3'-O-acetyl-5'-chloro-5'-deoxy-O²,2'-cyclocytidine hydroiodide;
3'-O-acetyl-5'-methoxy-O²,2'-cyclocytidine hydrochloride;
3'-O-acetyl-5'-benzoyl-O²,2'-cyclocytidine hydrobromide;
3'-O-acetyl-5'-benzyloxy-O²,2'-cyclocytidine hydrochloride;
3'-O-acetyl-5'-amino-O²,2'-cyclocytidine hydroiodide;
3'-O-acetyl-5'-methylamino-O²,2'-cyclocytidine hydrofluoride;
3'-O-acetyl-5'-azido-O²,2'-cyclocytidine hydrobromide;
3'-O-acetyl-N⁴-methyl-O²,2'-cyclocytidine hydrofluoride;
3'-O-acetyl-N⁴-dimethyl-O²,2'-cyclocytidine hydrochloride;
3'-O-acetyl-5-methyl-O²,2'-cyclocytidine hydrobromide;
3'-O-acetyl-5-hydroxymethyl-O²,2'-cyclocytidine hydrochloride;
3'-O-acetyl-5-nitro-O²,2'-cyclocytidine hydroiodide;
3'-O-benzoyl-5'-deoxy-5'-fluoro-O²,2'-cyclocytidine hydrobromide;
3'-O-benzoyl-N⁴-phenyl-O²,2'-cyclocytidine hydrofluoride;
3'-O-acetyl-O²,2'-cyclocytidine sulfate;
3'-O-butyryl-O²,2'-cyclocytidine phosphate;
3'-O-acetyl-O²,2'-cyclocytidine acetate;
3'-O-acetyl-O²,2'-cyclocytidine lactate and the like.

The preferred compounds of Formula II are 3'-O-acetyl-O²,2'-cyclocytidine hydrochloride; 3'-O-butyryl-O²,2'-cyclocytidine hydrochloride; and 3'-O-acetyl-5-fluoro-O²,2'-cyclocytidine hydrochloride.

Typical compounds represented by Formula III include, for example,

3'-O-acetyl-O²,2'-cyclo-5-azacytidine hydrochloride;
3'-O-butyryl-O²,2'-cyclo-5-azacytidine hydrochloride;
3'-O-acetyl-O²,2'-cyclo-5-azacytidine hydrobromide;
3'-O-butyryl-O²,2'-cyclo-5-azacytidine hydrobromide;
3'-O-acetyl-N⁴-methyl-O²,2'-cyclo-5-azacytidine hydrochloride;
3'-O-butyryl-N⁴-methyl-O²,2'-cyclo-5-azacytidine hydrochloride;
3'-O-acetyl-5'-chloro-5'-deoxy-O²,2'-cyclo-5-azacytidine hydrobromide;
3'-O-acetyl-N⁴-dimethyl-O²,2'-cyclo-5-azacytidine hydrofluoride;
3'-O-benzoyl-O²,2'-cyclo-5-azacytidine hydrochloride;
3'-O-benzoyl-N⁴-dimethyl-O²,2'-cyclo-5-azacytidine hydrobromide and the like.

The preferred compound of Formula III is 3'-O-acetyl-O²,2'-cyclo-5-azacytidine hydrochloride.

Typical compounds represented by Formula IV include, for example,

3'-O-acetyl-O²,2'-cyclo-6-azacytidine hydrochloride;
3'-O-acetyl-O²,2'-cyclo-6-azacytidine hydrobromide;
3'-O-benzoyl-O²,2'-cyclo-6-azacytidine hydrochloride;
3'-O-benzoyl-O²,2'-cyclo-6-azacytidine hydrobromide;
3'-O-acetyl-O²,2'-cyclo-5-methyl-6-azacytidine hydrochloride;
3'-O-acetyl-O²,2'-cyclo-5-methyl-6-azacytidine hydrobromide;
3'-O-acetyl-N⁴-methyl-O²,2'-cyclo-6-azacytidine hydrofluoride;
3'-O-benzoyl-N⁴-dimethyl-O²,2'-cyclo-6-azacytidine hydroiodide;
3'-O-acetyl-5'-chloro-5'-deoxy-O²,2'-cyclo-6-azacytidine hydrochloride and the like.

The preferred compound of Formula IV is 3'-O-acetyl-O²,2'-cyclo-6-azacytidine hydrochloride.

Typical compounds represented by Formula V, include, for example, (S) 2,2'-anhydro-1-(3'-O-butyryl-β-D-arabinofuranosyl)-2-thiocytosine hydrochloride;
(S) 2,2'-anhydro-1-(3'-O-acetyl-β-D-arabinofuranosyl)-2-thiocytosine hydrobromide;
(S) 2,2'-anhydro-1-(3'-O-butyryl-B-D-arabinofuranosyl)-2-thiocytosine hydroiodide;

(S) 2,2′-anhydro-1-(3′-O-propionyl-β-D-arabinofur-
 anosyl)-2-thiocytosine hydrofluoride;
(S) 2,2′-anhydro-1-(3′-O-acetyl-β-D-arabinofuranosyl)-
 2-thiocytosine hydroacetate and the like.

The preferred compounds of Formula V are (S) 2,2′-anhydro - 1 - (3′ - O - acetyl - β - D - arabinofuranosyl)-2-thiocytosine hydrochloride; and (S) 2,2′-anhydrol-(3′-O-butyryl-β-D-arabinofuranosyl) - 2 - thiocytosine hydrochloride.

The preferred compounds of Formula VIII are 1-(β-D-arabinofuranosyl)-5-azacytosine; 1-(5′-chloro - β - D-arabinofuranosyl-5-azacytosine and 1-(5′-bromo-β - D - arabinofuranosyl)-5-azacytosine. Typical salts represented by Formula VIIa include, for example, 1-(β-D-arabinofuranosyl)-5-azacytosine hydrochloride;
1-(5′-chloro-β-D-arabinofuranosyl)-5-azacytosine
 phosphate;
1-(5′-bromo-β-D-arabinofuranosyl)-5-azacytosine
 sulfate;
1-(β-D-arabinofuranosyl)- 5-azacytosine acetate and the like.

Typical salts represented by Formula VIIIa include, for example, 1-(2′-thio-β-D-arabinofuranosyl) cytosine hydrochloride;
1-(2′-thio-β-D-arabinofuranosyl) cytosine hydrobromide;
1-(2′-thio-β-D-arabinofuranosyl) cytosine phosphate;
1-(2′-thio-β-D-arabinofuranosyl) cytosine acetate.

The processes according to our invention of preparing the compounds of Formula I and converting these compounds to the corresponding arabinofuranosyl cytidine compounds can be represented by the following overall schematic reaction equation:

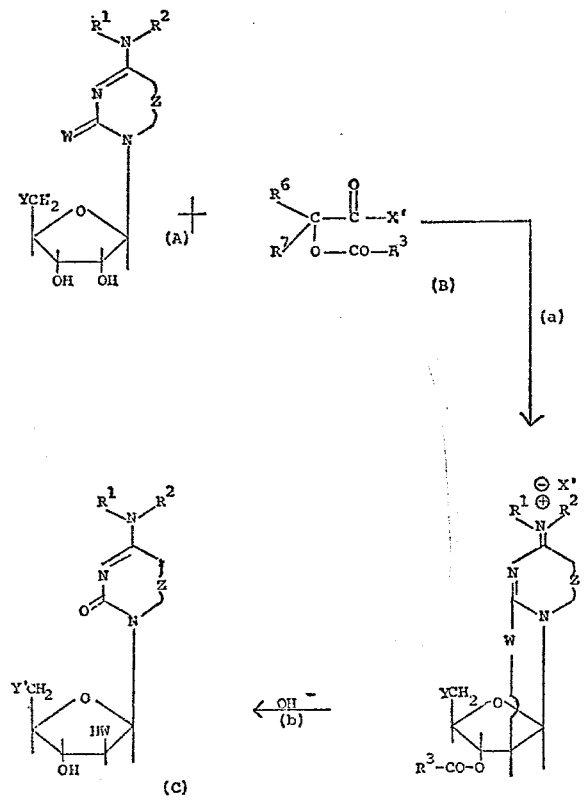

wherein $R^6$, $R^7$ are independently lower alkyl, aryl or alkylaryl and wherein when one of $R^6$ or $R^7$ is aryl or alkylaryl, the other can be H; X′ is chloride, bromide or iodide; and $R^1$, $R^2$, $R^3$, $R^4$, $R^5$, W, Y, and Z have the same meaning as set forth hereinabove; but where the cyclocytidine product (Formula I) is to be treated by alkaline hydrolysis to produce the corresponding arabinofuranosyl cytosine compound (Formula C) $R^4$ or $R^5$ cannot be halo and Y′ is H, hydroxy, halo, lower alkoxy, amino, lower alkylamino, or azido, but not acyloxy (as such groups will generally be cleaved by the hydrolysis step (step b)) and wherein when Z is

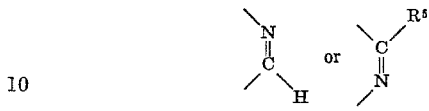

Y is hydroxy, chloro or bromo; and wherein when W is thia, Y is hydroxy, and $R^1$ and $R^2$ are H.

Considering the above process in greater detail, the halide salt compounds of Formula I, other than the fluoride salt compounds, are prepared according to our invention by treating the corresponding cytidine or cytidine derivatives or analogs (Formula A) with an α-acyloxy acyl chloride, bromide, or iodide of Formula B. Typically, the treatment will be conducted in an inert organic solvent at temperatures in the range of about from 0° to 150° C. for about from 5 minutes to 10 hours, with best results being obtained with temperatures in the range of about from 20 to 100° C. and treatment durations in the range of about from 5 minutes to 1 hour. Longer treatment durations are typically required with lower treatment temperatures. The relative ratio of reactants is typically in the range of about from 1 to 5 moles of α-acyloxy acid halide (Formula B) per mole of cytidine compound (Formula A), though mole ratios both above and below this can be used. Best results are obtained with mole ratios in the range of about from 2 to 4 moles of α-acyloxy acid halide (Formula B) per mole of cytidine compound (Formula A). In terms of ease of preparation and convenience of isolation of the cyclocytidine products, we have found that best results are obtained by preparing the chloride or bromide salts of Formula I. Suitable inert organic solvents which can be used include, for example, acetonitrile, nitromethane, glacial acetic acid, ethyl acetate, chloroform, 1,2-dimethoxyethane, benzene, dimethylformamide, dimethyl carbonate and the like. We have found particularly good results to be obtained using acetonitrile, especially where separation or isolation of the cyclocytidine halide salt product (Formula I) is desired, as we have found that many cyclocytidine halide salts typically crystallize out in this solvent, thereby permitting easy separation from residual reactants and by-products by simple decantation or filtration. In any event, regardless of whether an inert organic solvent is used, and if used, of the particular inert organic solvent used, the cyclocytidine halide salt product can be separated from the reaction mass and/or purified by any suitable procedure such as, for example, liquid-liquid extraction, chromatography, crystallization, etc., the details of which procedures are well within the scope of one having ordinary skill in the art. Typically, liquid-liquid extraction with a two-phase aqueous organic solvent extraction medium is, for example, a convenient separation procedure as many compounds of Formula I are typically soluble in the aqueous phase and essentially insoluble in the organic phase as compared to the reactants and by-products, while many of the reactants and by-products are typically soluble in the organic phase and essentially insoluble in the aqueous phase as compared with the compounds of Formula I.

The cytidine, or cytidine analogs and/or derivative starting materials, are known materials and can be obtained from commercial sources or prepared according to any suitable procedure. Further information regarding the starting materials and their preparation can, for example, be obtained from the literature wherein many such processes are either expressly outlined or would be apparent to one having ordinary skill in the art, note for example, The Chemistry of Nucleosides and Nucleotides, A. M. Michelson, Academic Press (1963); Synthetic Procedures in Nucleic Acid Chemistry, vol. 1, Zorbach and Tipson, John Wiley & Sons (1968); Collection of Czechoslovakian Chemical Communications, vol. 30, page 205 (1965) and U.S. Pat. 3,282,921. Suitable cytidine or cytidine analogs and/or derivative starting materials include, for example, cytidine; 5-azacytidine; 6-azacytidine; 5-chlorocytidine; 5-bromocytidine, 5-iodocytidine, 5-trifluoromethylcytidine; 5-nitrocytidine; 5-methyl-6-azacytidine; 2-thiocytidine and the like. We have further found that where the cytidine starting material has a free hydroxy group at the 5'-position (i.e., Y is Formula I), the group can be protected, if desired, with a conventional protecting agent such as a carboxylic acyl group containing less than 12 carbon atoms or an alkyl carbonate group. Protection of the hydroxy group is, however, typically not required and in the preparation of 1-(β,D-arabinofuranosyl)-cytosine or 1-(2-thio-β,D-arabinofuranosyl)-cytosine, the use of 5'-acyl group would be largely superfluous as such groups are usually cleaved by the hydrolysis step.

The α-acyloxy acyl halide starting materials of Formula (B) can, for example, be prepared by acetylating the corresponding α-hydroxy free acid. This can be effected, for example, by treating the α-hydroxy free acid with an acid chloride of the formula

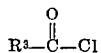

wherein $R^3$ is as defined hereinabove, either alone or in an inert organic solvent such as benzene, toluene or the like, which can optionally contain a tertiary base such as pyridine, N,N-dimethylaniline or the like.

The α-acyloxy acyl chloride, can for example, be prepared by treating the corresponding α-acyloxy acid with thionyl chloride or oxalyl chloride either alone or in an inert organic solvent such as methylene chloride, chloroform and the like, at a temperature of about 25° C. for a period of from 1 to 12 hours. In an alternative method, the free acid can be treated with triphenylphosphine in carbon tetrachloride at a temperature of about 25° C. for a period of about 1 to about 12 hours, and preferably for 10 to 12 hours.

The α-acyloxy acyl bromides can, for example, be prepared by treating the corresponding α-acyloxy free acid with an excess of phosphorous tribromide at reflux temperature for a period of about four hours. In an alternative method, an α-acyloxy acyl chloride is treated with an alkali metal bromide, preferably lithium bromide, or a quaternary ammonium bromide, such as tetramethylammonium bromide, tetraethylammonium bromide and the like, but preferably with the alkali metal bromide in an inert solvent such as ethyl acetate, dioxane, and the like, at a temperature of about 25° C. for a period of about one-half hour.

The α-acyloxy acyl iodide, can, for example, be prepared by treating the corresponding α-acyloxy acyl chloride with an alkali metal iodide, preferably lithium iodide, or a quaternary ammonium iodide such as tetraethylammonium iodide, tetramethylammonium iodide and the like, but preferably with the alkali metal iodide, in an inert solvent such as ethyl acetate, dioxane, dimethylformamide and the like, at a temperature of about 25° C. for a period of about one-half hour.

Suitable α-hydroxy acids which can be used to prepare the α-acyloxy acid halide starting materials of Formula (B) can be represented by the formula:

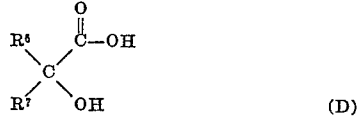

wherein $R^6$ and $R^7$ are as defined hereinabove and include, for example, lactic acid analogs such as, for example, 2-methyl lactic acid; atrolactic acid; 2-hydroxy-2-methyl butyric acid; 2-hydroxy-2-methyl valeric acid; 2-hydroxy-2-ethyl butyric acid; 2-hydroxy-2-methyl hexanoic acid; 2,3-diphenyl lactic acid; 2-methyl-3-phenyl lactic acid; and the like; mandelic acid and its analogs such as, for example, α-ethyl mandelic acid; α-propyl mandelic acid; α-isopropyl mandelic acid; α-butyl mandelic acid; α-isobutyl mandelic acid; α-seco-butyl mandelic acid; α-isopentyl mandelic acid; α-hexyl mandelic acid; m-methyl mandelic acid; p-isopropyl mandelic acid; α-cyclopropyl mandelic acid; α-cyclo-butyl mandelic acid; α-cyclopentyl mandelic acid; α-cyclo-hexyl mandelic acid; and the like; and benzilic acid and its analogs such as 3-methyl benzilic acid; 4-methyl benzilic acid; 2,3-dimethyl benzilic acid; 2,4-dimethyl benzilic acid; 2,5-dimethyl benzilic acid; 2,6-dimethyl benzilic acid; 3,4-dimethyl benzilic acid; 3,5-dimethyl benzilic acid; 2,2'-dimethyl benzilic acid; 3,3'-dimethyl benzilic acid; 4,4'-dimethyl benzilic acid; 2,3,4,6-tetramethyl benzilic acid; 2,3,5,6-tetramethyl benzilic acid; 3,3',4,4'-tetramethyl benzilic acid; 3,3',5,5'-tetramethyl benzilic acid; and the like.

As can be seen from the above schematic reaction equation, the particular halide form of α-acyloxy-acyl halide used will determine the particular quaternary halide salt form of the product (Formula I) obtained. Thus, where an α-acyloxy-acyl chloride is used, the resulting quaternary chloride salt form of the compounds of Formula I will be obtained. Alternatively, the quaternary halide salts of Formula I can be converted to different halide salts by any suitable procedure for effecting the replacement or exchange of one halide with another (e.g. replacement of chloride with fluoride). We have further found that the iodide and particularly the fluoride salts of our invention are best afforded in this manner. The ion exchange can, for example, be conveniently effected by treating a solution of the halide (typically chloride or bromide) salt of Formula I with an ion exchange resin in the desired halide form (typically fluoride or iodide).

Similarly, other pharmaceutically acceptable salts can be prepared by any suitable procedure for effecting exchange of the salt ion (i.e., $X^\ominus$) of the compound of Formula I with the desired pharmaceutically acceptable ion. Again, this can be conveniently effected through treatment of a solution of the salt of Formula I with an ion exchange resin in the desired anion form.

Considering now the conversion of the compounds of Formula I into the corresponding arabinofuranosyl compounds, we have found that the halide salts of Formula I wherein $R^4$ is H, lower alkyl, lower alkyl hydroxy, lower alkyl halide, nitro, amino, lower alkyl amino can be converted to the corresponding arabinofuranosylcytosine derivatives, according to our invention, by hydrolysis using an alkaline solution. We have found that the cyclocytidine compounds of our invention (Formula I) wherein $R^4$ is halo, cannot be conveniently treated with an alkaline solution without substantial destruction of the cytosine ring and thus are not suitable reactants for this treatment. This hydrolysis can be represented by the following subgeneric schematic equations representing the typical cyclocytidine conversion and the (S) 2,2'-anhydro-1-(3'-O-acyl-β-D-arabinofuranosyl)-2-thiocytosine conversion, respectively.

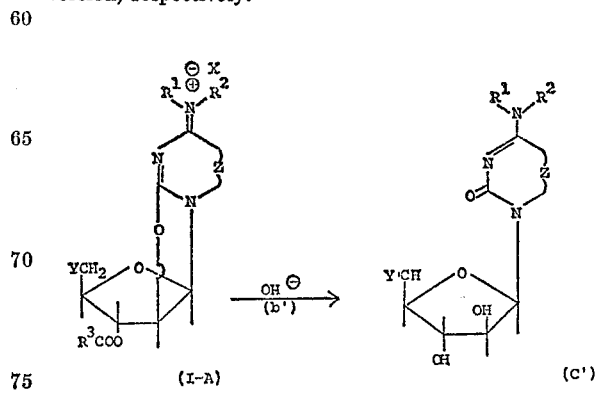

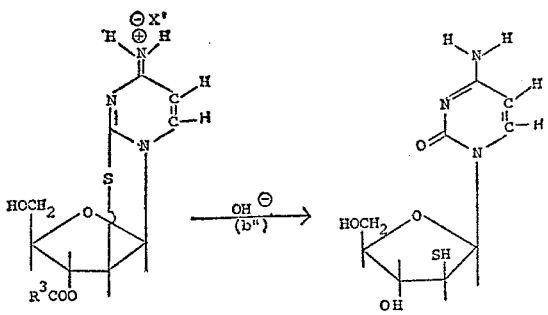

wherein $R^1$, $R^2$, $R^3$, $R^4$, $R^5$, $X'$, Y, $Y'$, and Z have the same meaning as set forth herein above but $R^4$ and/or $R^5$ cannot be halo. In terms of ease of preparation and isolation of products, best results are obtained wherein X or $X'$ is chloro or bromo.

The hydrolysis (steps b' or b'') is conveniently effected by treatment of such compounds of Formula IA or Formula V, wherein $R^4$ and/or $R^5$ are not halo, with an alkaline solution and preferably an aqueous alkali solution such as, for example, aqueous; sodium hydroxide, potassium hydroxide, ammonium hydroxide, tetramethylammonium hydroxide and the like. We have also found that best results are obtained and by-products minimized by separating the cyclocytidine products from the reaction mass prior to the hydrolysis treatment. The isolation can typically be conveniently effected, for example, by liquid-liquid extraction with water and a suitable water immiscible inert organic solvent or even by simple washing with a suitable inert organic solvent such as, for example, ether, chloroform, ethyl acetate, and the like. The hydrolysis treatment is typically conducted at temperatures in the range of about from 0 to 100° C. for about from 1 to 24 hours. Best results are obtained using temperatures in the range of about from 20 to 50° C. and treatment durations of about from 1 to 10 hours. The ratio of reactants is typically in the range of about from .1 to .5 mole of the compound of Formula I per mole of active hydroxyl, though mole ratios both above and below this can be used. Typically the relative quantity and concentration of alkaline solution will be adjusted to provide a reaction solution having a pH in the range of about 10 to 14. The resulting arabinofuranosylcytosine compounds can be separated from the reaction mass and further purified by any suitable procedure such as, for example, ion exchange chromatography, cellulose chromatography, and crystallization. The 1-β-D-arabinofuranosylcytosine compounds or 1-(2-thio-β-D-arabinofuranosyl)-cytosine compounds can, for example, where a volatile base, such as, for example, ammonium hydroxide is used, be conveniently separated from the reaction mass by vacuum evaporation of the alkaline solution, and the product residue further purified if desired, by dissolution in a suitable solvent, e.g. methanol or ethanol and chromatographic purification of the solution. Where a non-volatile base, such as, for example, alkali metal solution, is used, the solution should be neutralized to about pH 8 with a suitable ion exchange resin prior to evaporation.

Pharmaceutically acceptable salts of 1-(β-D-arabinofuranosyl)-5-azacytosine compounds and their 5'-chloro or 5-bromo derivatives and of 1-(2'-thio-β-D-arabinofuranosyl)-cytosine can be prepared by any suitable method for converting 1-β-D-arabinofuranosyl cytosine compounds to their pharmaceutically acceptable salts. One convenient method is to treat a solution of the compounds of Formula VII or VIII, in a solvent in which the desired salt is insoluble, with a soluble acid, or suitable soluble salt, of the desired anion, thereby affording precipitation of the desired pharmaceutically acceptable salt of Formula VIIa or VIIIa, respectively. The pharmaceutically acceptable salts can also be conveniently prepared from other salts by ion exchange, using, for example, the appropriate ion exchange resin form. The details of these procedures are well within the scope of an artisan and optimization can be effected by routine experimentation.

The 1-β-D-arabinofuranosyl compounds are known to be pharmaceutically useful for their anti-viral, and particularly for their anti-herpes and cytotoxic activity. Further information concerning the pharmaceutical application of these compounds can be had by reference to the literature of the art such as, for example, U.S. Pat. 3,412,-416 (note columns 5–6 and 19–20). The compounds of our invention (Formulas I, VII, VIIa, VIII and VIIIa) also exhibit antiviral, and especially anti-herpes, activity and cytotoxic activity in mammals and are useful in the treatment of viral diseases. The compounds can be administered either orally or intravenously in a suitable pharmaceutical carrier. Typically, these compounds can be administered in the same manner as 1-β-D-arabinofuranosyl cytosine. The particular dosage will, of course, vary with the particular subject and condition being treated.

A further understanding of our invention can be had from the following illustrative examples.

EXAMPLE 1

This example illustrates a method according to our invention of preparing chloride salt compounds of our invention. In this example 660 mg. of 2-acetoxy-2-methylpropionyl chloride is added to a suspension containing 243 mg. of cytidine in 5 ml. of anhydrous acetonitrile at 80° C. and stirred vigorously. After 15 minutes the mixture is cooled to room temperature and the resulting crystalline 3'-O-acetyl-$O^2$,2'-cyclocytidine hydrochloride product is recovered by filtration, then washed with anhydrous acetone and dried in vacuo. The product residue is then further purified by the crystallization from methanol by the slow addition of acetone.

By following the above procedure but using the following cytidine derivatives, the corresponding cyclocytidine hydrochloride salts are prepared:

5'-chloro-5'-deoxycytidine to 3'-O-acetyl-5'-chloro-5'-deoxy-$O^2$,2'-cyclocytidine hydrochloride;
5'-deoxy-5'-fluoro-cytidine to 3'-O-acetyl-5'-deoxy-5'-fluoro-$O^2$,2'-cyclocytidine hydrochloride;
5'-bromo-5'-deoxycytidine to 3'-O-acetyl-5'-bromo-5'-deoxy-$O^2$,2'-cyclocytidine hydrochloride;
5'-deoxy-5'-iodo-cytidine to 3'-O-acetyl-5'-deoxy-5'-iodo-$O^2$,2'-cyclocytidine hydrochloride;
5'-methoxycytidine to 3'-O-acetyl-5'-methoxy-$O^2$,2'-cyclocytidine hydrochloride;
5'-O-benzoylcytidine to 3'-O-acetyl-5'-O-benzoyl-$O^2$,2'-cyclocytidine hydrochloride;
5'-O-benzylcytidine to 3'-O-ocetyl-5'-O-benzyl-$O^2$,2'-cyclocytidine hydrochloride;
5'-amino-5'-deoxycytidine to 3'-O-acetyl-5'-amino-5'-deoxy-$O^2$,2'-cyclocytidine hydrochloride;
5'-deoxy-5'-methylaminocytidine to 3'-O-acetyl-5'-deoxy-5'-methylamino-$O^2$,2'-cyclocytidine hydrochloride;
5'-azido-5'-deoxycytidine to 3'-O-acetyl-5'-azido-5'-deoxy-$O^2$,2'-cyclocytidine hydrochloride;
$N^4$-methylcytidine to 3'-O-acetyl-$N^4$-methyl-$O^2$,2'-cyclocytidine hydrochloride;
$N^4$-dimethylcytidine to 3'-O-acetyl-$N^4$-dimethyl-$O^2$,2'-cyclocytidine hydrochloride;
$N^4$-phenylcytidine to 3'-O-acetyl-$N^4$-phenyl-$O^2$,2'-cyclocytidine hydrochloride;
5-methylcytidine to 3'-O-acetyl-5-methyl-$O^2$,2'-cyclocytidine hydrochloride;
5-hydroxymethylcytidine to 3'-O-acetyl-5-hydroxymethyl-$O^2$,2'-cyclocytidine hydrochloride;

5-fluorocytidine to 3'-O-acetyl-5-fluoro-$O^2$,2'-cyclocytidine hydrochloride;
5-chlorocytidine to 3'-O-acetyl-5-chloro-$O^2$,2'-cyclocytidine hydrochloride;
5-bromocytidine to 3'-O-acetyl-5-bromo-$O^2$,2'-cyclocytidine hydrochloride;
5-iodocytidine to 3'-O-acetyl-5-iodo-$O^2$,2'-cyclocytidine hydrochloride;
5-nitrocytidine to 3'-O-acetyl-5-nitro-$O^2$,2'-cyclocytidine hydrochloride;
5-aminocytidine to 3'-O-acetyl-5-amino-$O^2$,2'-cyclocytidine hydrochloride;
5'-O-benzoyl-5-fluorocytidine to 3'-O-acetyl-5'-O-benzoyl-5-fluoro-$O^2$,2'-cyclocytidine hydrochloride;
5'-amino-5-chloro-5'-deoxycytidine to 3'-O-acetyl-5'-amino-5-chloro-5'-deoxy-$O^2$,2' cyclocytidine hydrochloride;
5'-azido-5'-deoxy-5-nitrocytidine to 3'-O-acetyl-5'-azido-5'-deoxy-5-nitro-$O^2$,2'-cyclocytidine hydrochloride;
6-azacytidine to 3'-O-acetyl-$O^2$,2'-cyclo-6-azacytidine hydrochloride;
5-methyl-6-azacytidine to 3'-O-acetyl-5-methyl-6-azacytidine hydrochloride;
5'-chloro-5'-deoxy-6-azacytidine to 3'-O-acetyl-5'-chloro-5'-deoxy-$O^2$,2'-cyclo-6-azacytidine hydrochloride;
5'-bromo-5'-deoxy-6-azacytidine to 3'-O-acetyl-5'-bromo-5'-deoxy-$O^2$,2'-cyclo-6-azacytidine hydrochloride;
$N^4$-methyl-6-azacytidine to 3'-O-acetyl-$N^4$-methyl-$O^2$,2'-cyclo-6-azacytidine hydrochloride;
$N^4$-dimethyl-6-azacytidine to 3'-O-acetyl-$N^4$-dimethyl-$O^2$,2'-cyclo-6-azacytidine hydrochloride;
5-azacytidine to 3'-O-acetyl-$O^2$,2'-cyclo-6-azacytidine hydrochloride;
5'-chloro-5'-deoxy-5-azacytidine to 3'-O-acetyl-5'-chloro-5'-deoxy-$O^2$,2'-cyclo-5-azacytidine hydrochloride;
5'-bromo-5'-deoxy-5-azacytidine to 3'-O-acetyl-5'-bromo-5'-deoxy-$O^2$,2'-cyclo-5-azacytidine hydrochloride;
$N^4$-methyl-5-azacytidine to 3'-O-acetyl-$N^4$-methyl-$O^2$,2'-cyclo-5-azacytidine hydrochloride;
$N^4$-dimethyl-5-azacytidine to 3'-O-acetyl-$N^4$-dimethyl-$O^2$,2'-cyclo-5-azacytidine hydrochloride.

By following the above procedure using 2-butyryloxy-2-methylpropionyl chloride in place of 2-acetoxy-2-methylpropionyl chloride, the corresponding 3'-O-butyryl forms of the above compounds are prepared.

EXAMPLE 2

This example illustrates a method according to our invention of preparing the bromide salt form of the compounds of our invention. In this example 836 mg. of 2-acetoxy-2-methylpropionyl bromide is added to a suspension containing 243 mg. of cytidine in 5 ml. of dry acetonitrile and stirred at room temperature (i.e. about 20° C.) for 30 minutes. The resulting solution is evaporated to dryness and the residue partitioned between water and ether. The aqueous phase is separated and evaporated affording a residue of 3'-O-acetyl-$O^2$,2'-cyclocytidine hydrobromide which is further purified by crystallization from methanol by the slow addition of acetone.

The following cyclocytidine hydrobromides are prepared by following the above procedure using the corresponding cytidine derivative starting materials listed in Example 1 as starting materials.

3'-O-acetyl-5'-chloro-5'-deoxy-$O^2$,2'-cyclocytidine hydrobromide;
3'-O-acetyl-5'-deoxy-5'-fluoro-$O^2$,2'-cyclocytidine hydrobromide;
3'-O-acetyl-5'-bromo-5'-deoxy-$O^2$,2'-cyclocytidine hydrobromide;
3'-O-acetyl-5'-deoxy-5'-iodo-$O^2$,2'-cyclocytidine hydrobromide;
3'-O-acetyl-5'-methoxy-$O^2$,2'-cyclocytidine hydrobromide;
3'-O-acetyl-5'-O-benzoyl-$O^2$,2'-cyclocytidine hydrobromide;
3'-O-acetyl-5'-O-benzyl-$O^2$,2'-cyclocytidine hydrobromide;
3'-O-acetyl-5'-amino-5'-deoxy-$O^2$,2'-cyclocytidine hydrobromide;
3'-O-acetyl-5'-deoxy-5'-methylamino-$O^2$,2'-cyclocytidine hydrobromide;
3'-O-acetyl-5'-azido-5'-deoxy-$O^2$,2'-cyclocytidine hydrobromide;
3'-O-acetyl-$N^4$-methyl-$O^2$,2'-cyclocytidine hydrobromide;
3'-O-acetyl-$N^4$-dimethyl-$O^2$,2'-cyclocytidine hydrobromide;
3'-O-acetyl-$N^4$-phenyl-$O^2$,2'-cyclocytidine hydrobromide;
3'-O-acetyl-5-methyl-$O^2$,2'-cyclocytidine hydrobromide;
3'-O-acetyl-5-hydroxy-methyl-$O^2$,2'-cyclocytidine hydrobromide;
3'-O-acetyl-5-fluoro-$O^2$,2'-cyclocytidine hydrobromide;
3'-O-acetyl-5-chloro-$O^2$,2'-cyclocytidine hydrobromide;
3'-O-acetyl-5-bromo-$O^2$,2'-cyclocytidine hydrobromide;
3'-O-acetyl-5-iodo-$O^2$,2'-cyclocytidine hydrobromide;
3'-O-acetyl-5-nitro-$O^2$,2'-cyclocytidine hydrobromide;
3'-O-acetyl-5-amino-$O^2$,2-cyclocytidine hydrobromide;
3'-O-acetyl-5'-O-benzoyl-5-fluoro-$O^2$,2'-cyclocytidine hydrobromide;
3'-O-acetyl-5'-amino-5-chloro-5'-deoxy-$O^2$,2'-cyclocytidine hydrobromide;
3'-O-acetyl-5-'-azido-5'-deoxy-5-nitro-$O^2$,2'-cyclocytidine hydrobromide;
3'-O-acetyl-$O^2$,2'-cyclo-6-azacytidine hydrobromide;
3'-O-acetyl-5-methyl-$O^2$,2'-cyclo-6-azacytidine hydrobromide;
3'-O-acetyl-5'-chloro-5'-deoxy-$O^2$,2'-cyclo-6-azacytidine hydrobromide;
3'-O-acetyl-5'bromo-5'-deoxy-$O^2$,2'-cyclo-6-azacytidine hydrobromide;
3'-O-acetyl-$N^4$-methyl-$O^2$,2'-cyclo-6-azacytidine hydrobromide;
3'-O-acetyl-$N^4$-dimethyl-$O^2$,2'-cyclo-6-azacytidine hydrobromide;
3'-O-acetyl-$O^2$,2'-cyclo-5-azacytidine hydrobromide;
3'-O-acetyl-5'-chloro-5'-deoxy-$O^2$,2'-cyclo-5-azacytidine hydrobromide;
3'-O-acetyl-5'-bromo-5'-deoxy-$O^2$,2'-cyclo-5-azacytidine hydrobromide;
3'-O-acetyl-$N^4$-methyl-$O^2$,2'-cyclo-5-azacytidine hydrobromide;
3'-O-acetyl-$N^4$-dimethyl-$O^2$,2'-cyclo-5-azacytidine hydrobromide.

By following the above procedure using 2-butyryloxy-2-methylpropionyl in place of 2-acetoxy-2-methylpropionyl bromide, the corresponding 3'-O-butyryl forms of the above compounds are prepared.

EXAMPLE 3

This example illustrates a method according to our invention of preparing the fluoride salt compounds, of our invention, by ion exchanging the corresponding bromide compounds of our invention with a fluoride ion. In this example 20 ml. of an aqueous solution containing 1 g. of 3'-O-acetyl-$O^2$,2'-cyclocytidine hydrochloride is passed through a column containing 50 ml. of a quaternary ammonium ion exchange resin (i.e., Dowex (−1)) in the fluoride salt form. The resulting effluent and water washes are evaporated to dryness in vacuo and the residue is crystallized from methanol, by the addition of acetone, affording 3'-O-acetyl-$O^2$,2'-cyclocytidine hydrofluoride.

By following the above procedure using the corresponding chloride salt compounds of our invention, of Example 1, the following compounds are prepared:

3'-O-acetyl-5'-chloro-5'-deoxy-$O^2$,2'-cyclocytidine hydrofluoride;

3'-O-acetyl-5'-deoxy-5'-fluoro-O²,2'-cyclocytidine hydrofluoride;
3'-O-acetyl-5'-bromo-5'deoxy-O²,2'-cyclocytidine hydrofluoride;
3'-O-acetyl-5'-deoxy-5'-iodo-O²,2'-cyclocytidine hydrofluoride;
3'-O-acetyl-5'-methoxy-O²,2'-cyclocytidine hydrofluoride;
3'-O-acetyl-5'-O-benzoyl-O²,2'-cyclocytidine hydrofluoride;
3'-O-acetyl-5'-O-benzyl-O²,2'-cyclocytidine hydrofluoride;
3'-O-acetyl-5'-amino-5'-deoxy-O²,2'-cyclocytidine hydrofluoride;
3'-O-acetyl-5'-deoxy-5'-methylamino-O²,2'-cyclocytidine hydrofluoride;
3'-O-acetyl-5'-azido-5'-deoxy-O²,2'-cyclocytidine hydrofluoride;
3'-O-acetyl-N⁴-methyl-O²,2'-cyclocytidine hydrofluoride;
3'-O-acetyl-N⁴-dimethyl-O²,2'-cyclocytidine hydrofluoride;
3'-O-acetyl-N⁴-phenyl-O²,2'-cyclocytidine hydrofluoride;
3'-O-acetyl-5-methyl-O²,2'-cyclocytidine hydrofluoride;
3'-O-acetyl-5-hydroxymethyl-O²,2'-cyclocytidine hydrofluoride;
3'-O-acetyl-5-fluoro-O²,2'-cyclocytidine hydrofluoride;
3'-O-acetyl-5-chloro-O²,2'-cyclocytidine hydrofluoride;
3'-O-acetyl-O²,2'-cyclocytidine hydrofluoride;
3'-O-acetyl-5-iodo-O²,2'-cyclocytidine hydrofluoride;
3'-O-acetyl-5-nitro-O²,2'-cyclocytidine hydrofluoride;
3 O-acetyl-5-amino-O²,2'-cyclocytidine hydrofluoride;
3'-O-acetyl-5'-O-benzoyl-5-fluoro-O²,2'-cyclocytidine hydrofluoride;
3'-O-acetyl-5'-amino-5-chloro-5'-deoxy-O²,2'-cyclocytidine hydrofluoride;
3'-O-acetyl-5'-azido-5'-deoxy-5-nitro-O²,2'-cyclocytidine hydrofluoride;
3'-O-acetyl-O²,2'-cyclo-6-azacytidine;
3'-O-acetyl-5-methyl-O²,2'-cyclo-6-azacytidine hydrofluoride;
3'-O-acetyl-5'-chloro-5'-deoxy-O²,2'-cyclo-6-azacytidine hydofluoride;
3'-O-acetyl-5'-bromo-5'-deoxy-O²,2'-cyclo-6-azacytidine hydrofluoride;
3'-O-acetyl-N⁴-methyl-O²,2'-cyclo-6-azacytidine hydrofluoride;
3'-O-acetyl-N⁴-dimethyl-O²,2'-cyclo-6-azacytidine hydrofluoride;
3'-O-acetyl-O²,2'-cyclo-5-azacytidine hydrofluoride;
3'-O-acetyl-5'-chloro-5'-deoxy-O²,2'-cyclo-6-azacytidine hydrofluoride;
3'-O-acetyl-5'-bromo-5'-deoxy-O²,2'-cyclo-5-azacytidine hydrofluoride;
3'-O-acetyl-N⁴-methyl-O²,2'-cyclo-5-azacytidine hydrofluoride;
3'-O-acetyl-N⁴-dimethyl-O²,2'-cyclo-5-azacytidine hydrofluoride.

The above compounds are also prepared according to the same ion change procedure from the corresponding bromide salt compounds, of our invention, of Example 2.

EXAMPLE 4

By following the above procedure using the corresponding iodide salt form of the ion exchange resin and products, of Example 1, the following compounds are prepared:

3'-O-acetyl-5'-chloro-5'-deoxy-O²,2'-cyclocytidine hydroiodide;
3'-O-acetyl-5'-deoxy-5'-fluoro-O²,2'-cyclocytidine hydroiodide;
3'-O-acetyl-5'-bromo-5'-deoxy-O²,2'-cyclocytidine hydroiodide;
3'-O-acetyl-5'-deoxy-5'-iodo-O²,2'-cyclocytidine hydroiodide;
3'-O-acetyl-5'-methoxy-O²,2'-cyclocytidine hydroiodide;
3'-O-acetyl-5'-O-benzoyl-O²,2'-cyclocytidine hydroiodide;
3'-O-acetyl-5'-O-benzyl-O²,2'-cyclocytidine hydroiodide;
3'-O-acetyl-5'-amino-5'-deoxy-O²,2'-cyclocytidine hydroiodide;
3'-O-acetyl-5'-deoxy-5'-methylamino-O²,2'-cyclocytidine hydroiodide;
3'-O-acetyl-5'-azido-5'-deoxy-O²,2'-cyclocytidine hydroiodide;
3'-O-acetyl-N⁴-methyl-O²,2'-cyclocytidine hydroiodide;
3'-O-acetyl-N⁴-dimethyl-O²,2'-cyclocytidine hydroiodide;
3'-O-acetyl-N⁴-phenyl-O²,2'-cyclocytidine hydroiodide;
3'-O-acetyl-5-methyl-O²,2'-cyclocytidine hydroiodide;
2'-O-acetyl-5-hydroxymethyl-O²,2'-cyclocytidine hydroiodide;
3'-O-acetyl-5-fluoro-O²,2'-cyyclocytidine hydroiodide;
3'-O-acetyl-5-chloro-O²,2'-cyclocytidine hydroiodide;
3'-O-acetyl-5-bromo-O²,2'-cyclocytidine hydroiodide;
3'-O-acetyl-5-iodo-O²,2'-cyclocytidine hydroiodide;
3'-O-acetyl-O²,2'-cyclo-5-nitro-cytidine hydroiodide;
3'-O-acetyl-5-amino-O²,2'-cyclocytidine hydroiodide;
3'-O-acetyl-5'-O-benzoyl-5-fluoro-O²,2'-cyclocytidine hydroiodide;
3'-O-acetyl-5'-amino-5-chloro-5'-deoxy-O²,2'-cyclocytidine hydroiodide;
3'-O-acetyl-5'-azido-5'-deoxy-5-nitro-O²,2'-cyclocytidine hydroiodide;
3'-O-acetyl-O²,2'-cyclo-6-azacytidine;
3'-O-acetyl-5-methyl-O²,2'-cyclo-6-azacytidine hydroiodide;
3'-O-acetyl-5'-chloro-5'-deoxy-O²,2'-cyclo-6-azacytidine hydroiodide;
3'-O-acetyl-5'-bromo-5'-deoxy-O²,2'-cyclo-6-azacytidine hydroiodide;
3'-O-acetyl-N⁴-methyl-O²,2'-cyclo-6-azacytidine hydroiodide;
3'-O-acetyl-N⁴-dimethyl-O²,2'-cyclo-6-azacytidine hydroiodide;
3'-O-acetyl-O²,2'-cyclo-5-azacytidine hydroiodide;
3'-O-acetyl-5'-chloro-5'-deoxy-O²,2'-cyclo-5-azacytidine hydroiodide;
3'-O-acetyl-5'-bromo-5'-deoxy-O²,2'-cyclo-5-azacytidine hydroiodide;
3'-O-acetyl-N⁴-methyl-O²,2'-cyclo-5-azacytidine hydroiodide;
3'-O-acetyl-N⁴-dimethyl-O²,2'-cyclo-5-azacytidine hydroiodide.

The above compounds are also prepared according to the same ion change procedure from the corresponding bromide salt compounds, of our invention, of Example 2.

EXAMPLE 5

By following the same procedure as set forth in Example 3 using the hydrofluoride salt products enumerated in Example 3 as starting materials and respectively using the corresponding sulfate; phosphate; acetate; and lactate salt forms of ion exchange resin, the corresponding sulfate; phosphate; acetate; and lactate salts of the products of Example 3 are respectively prepared.

EXAMPLE 6

This example illustrates a method according to our invention of preparing the 3'-O-benzoyl forms of the compounds of our invention. In this example 908 mg. of 2-benzoyloxy-2-methylpropionyl chloride is added to a suspension containing 243 mg. of cytidine and 5 ml. of anhydrous acetonitrile and stirred vigorously at 75° C. for 1 hour. The reaction mixture is diluted with ether affording a 3'-O-benzoyl-$O^2,2'$-cyclocytidine hydrochloride precipitate which is removed by filtration, then washed with dry acetone and dried in vacuo. The product residue is then further purified by recrystallization using methanol-acetone.

By following the above procedure but using the cytidine derivatives used in Example 1, the following corresponding cyclocytidine hydrochloride salts are respectively prepared:

3'-O-benzoyl-5'-chloro-5'-deoxy-$O^2,2'$-cyclocytidine hydrochloride;
3'-O-benzoyl-5'-deoxy-5'-fluoro-$O^2,2'$-cyclocytidine hydrochloride;
3'-O-benzoyl-5'-bromo-5'-deoxy-$O^2,2'$-cyclocytidine hydrochloride;
3'-O-benzoyl-5'-deoxy-5'-iodo-$O^2,2'$-cyclocytidine hydrochloride;
3'-O-benzoyl-5'-methoxy-$O^2,2'$-cyclocytidine hydrochloride;
3',5'-di-O-benzoyl-$O^2,2'$-cyclocytidine hydrochloride;
3'-O-benzoyl-5'-O-benzyl-$O^2,2'$-cyclocytidine hydrochloride;
3'-O-benzoyl-5'-amino-5'-deoxy-$O^2,2'$-cyclocytidine hydrochloride;
3'-O-benzoyl-5'-deoxy-5'-methylamino-$O^2,2'$-cyclocytidine hydrochloride;
3'-O-benzoyl-5'-azido-5'-deoxy-$O^2,2'$-cyclocytidine hydrochloride;
3'-O-benzoyl-$N^4$-methyl-$O^2,2'$-cyclocytidine hydrochloride;
3'-O-benzoyl-$N^4$-dimethyl-$O^2,2'$-cyclocytidine hydrochloride;
3'-O-benzoyl-$N^4$-phenyl-$O^2,2'$-cyclocytidine hydrochloride;
3'-O-benzoyl-5-methyl-$O^2,2'$-cyclocytidine hydrochloride;
3'-O-benzoyl-5-hydroxymethyl-$O^2,2'$-cyclocytidine hydrochloride;
3'-O-benzoyl-5-fluoro-$O^2,2'$-cyclocytidine hydrochloride;
3'-O-benzoyl-5-chloro-$O^2,2'$-cyclocytidine hydrochloride;
3'-O-benzoyl-5-bromo-$O^2,2'$-cyclocytidine hydrochloride;
3'-O-benzoyl-5-iodo-$O^2,2'$-cyclocytidine hydrochloride;
3'-O-benzoyl-$O^2,2'$-cyclo-5-nitro-cytidine hydrochloride;
5-amino-3'-O-benzoyl-$O^2,2'$-cyclocytidine hydrochloride;
3',5'-di-O-benzoyl-5-fluoro-$O^2,2'$-cyclocytidine hydrochloride;
5'-amino-3'-O-benzoyl-5-chloro-5'-deoxy-$O^2,2'$-cyclocytidine hydrochloride;
5'-azido-3'-O-benzoyl-5'-deoxy-5-nitro-$O^2,2'$-cyclocytidine hydrochloride;
3'-O-benzoyl-$O^2,2'$-cyclo-6-azacytidine hydrochloride;
3'-O-benzoyl-5-methyl-$O^2,2'$-cyclo-6-azacytidine hydrochloride;
3'-O-benzoyl-5'-chloro-5'-deoxy-$O^2,2'$-cyclo-6-azacytidine hydrochloride;
3'-O-benzoyl-5'-bromo-5'-deoxy-$O^2,2'$-cyclo-6-azacytidine hydrochloride;
3'-O-benzoyl-$N^4$-methyl-$O^2,2'$-cyclo-6-azacytidine hydrochloride;
3'-O-benzoyl-$N^4$-dimethyl-$O^2,2'$-cyclo-6-azacytidine hydrochloride;
3'-O-benzoyl-$O^2,2'$-cyclo-5-azacytidine hydrochloride;
3'-O-benzoyl-5'-chloro-5'-deoxy-$O^2,2'$-cyclo-5-azacytidine hydrochloride;
3'-O-benzoyl-5'-bromo-5'-deoxy-$O^2,2'$-cyclo-5-azacytidine hydrochloride;
3'-O-benzoyl-$N^4$-methyl-$O^2,2'$-cyclo-5-azacytidine hydrochloride;
3'-O-benzoyl-$N^4$-dimethyl-$O^2,2'$-cyclo-5-azacytidine hydrochloride.

EXAMPLE 7

This example illustrates a method according to our invention of preparing 3'-O-benzoyl bromide salt forms of the compound of our invention. In this example 908 mg. of 2-benzoyloxy-2-methylpropionyl bromide is added to a suspension of 243 mg. of cytidine and 5 ml. of anhydrous acetonitrile and stirred vigorously at 40° C. for 1 hour. The resulting solution is evaporated to dryness and the residue partitioned between ether and water. The aqueous phase is separated and evaporated and the residue is crystallized from a methanol-chloroform solution affording 3'-O-benzoyl-$O^2,2'$-cyclocytidine hydrobromide.

By following the above procedure but using the cytidine derivatives used in Example 1, the following corresponding cyclocytidine hydrobromide salts are respectively prepared:

3'-O-benzoyl-5'-chloro-5'-deoxy-$O^2,2'$-cyclocytidine hydrobromide;
3'-O-benzoyl-5'-deoxy-5'-fluoro-$O^2,2'$-cyclocytidine hydrobromide;
3'-O-benzoyl-5'-bromo-5'-deoxy-$O^2,2'$-cyclocytidine hydrobromide;
3'-O-benzoyl-5'-deoxy-5'-iodo-$O^2,2'$-cyclocytidine hydrobromide;
3'-O-benzoyl-5'-methoxy-$O^2,2'$-cyclocytidine hydrobromide;
3',5'-di-O-benzoyl-$O^2,2'$-cyclocytidine hydrobromide;
3'-O-benzoyl-5'-O-benzyl-$O^2,2'$-cyclocytidine hydrobromide;
3'-O-benzoyl-5'-amino-5'-deoxy-$O^2,2'$-cyclocytidine hydrobromide;
3'-O-benzoyl-5'-deoxy-5'-methylamino-$O^2,2'$-cyclocytidine hydrobromide;
3'-O-benzoyl-5'-azido-5'-deoxy-$O^2,2'$-cyclocytidine hydrobromide;
3'-O-benzoyl-$N^4$-methyl-$O^2,2'$-cyclocytidine hydrobromide;
3'-O-benzoyl-$N^4$-dimethyl-$O^2,2'$-cyclocytidine hydrobromide;
3'-O-benzoyl-$N^4$-phenyl-$O^2,2'$-cyclocytidine hydrobromide;
3'-O-benzoyl-5-methyl-$O^2,2'$-cyclocytidine hydrobromide;
3'-O-benzoyl-5-hydroxymethyl-$O^2,2'$-cyclocytidine hydrobromide;
3'-O-benzoyl-5-fluoro-$O^2,2'$-cyclocytidine hydrobromide;
3'-O-benzoyl-5-chloro-$O^2,2'$-cyclocytidine hydrobromide;
3'-O-benzoyl-5-iodo-$O^2,2'$-cyclocytidine hydrobromide;
3'-O-benzoyl-5-nitro-$O^2,2'$-cyclocytidine hydrobromide;
3'-O-benzoyl-5-amino-$O^2,2'$-cyclocytidine hydrobromide;
3',5'-di-O-benzoyl-5-fluoro-$O^2,2'$-cyclocytidine hydrobromide;
3'-O-benzoyl-5'-amino-5-chloro-5'-deoxy-$O^2,2'$-cyclocytidine hydrobromide;

3'-O-benzoyl-5'-azido-5'-deoxy-5-nitro-$O^2$,2'-cyclocytidine hydrobromide;
3'-O-benzoyl-$O^2$,2'-cyclo-6-azacytidine hydrobromide;
3'-O-benzoyl-5-methyl-$O^2$,2'-cyclo-6-azacytidine hydrobromide;
3'-O-benzoyl-5'-chloro-5'-deoxy-$O^2$,2'-cyclo-6-azacytidine hydrobromide;
3'-O-benzoyl-5'-bromo-5'-deoxy-$O^2$,2'-cyclo-6-azacytidine hydrobromide;
3'-O-benzoyl-$N^4$-methyl-$O^2$,2'-cyclo-6-azacytidine hydrobromide;
3'-O-benzoyl-$N^4$-dimethyl-$O^2$,2'-cyclo-6-azacytidine hydrobromide;
3'-O-benzoyl-$O^2$,2'-cyclo-5-azacytidine hydrobromide;
3'-O-benzoyl-5'-chloro-5'-deoxy-$O^2$,2'-cyclo-5-azacytidine hydrobromide;
3'-O-benzoyl-5'-bromo-5'-deoxy-$O^2$,2'-cyclo-5-azacytidine hydrobromide;
3'-O-benzoyl-$N^4$-methyl-$O^2$,2'-cyclo-5-azacytidine hydrobromide;
3'O-benzoyl-$N^4$-dimethyl-$O^2$,2'-cyclo-5-azacytidine hydrobromide.

EXAMPLE 8

This example illustrates a method according to our invention of converting cytidine compounds into the corresponding 1-β-D-arabinofuranosylcytosine compounds. In this example a mixture containing 247 mg. of cytidine and 660 mg. of 2-acetoxy-2-methylpropionyl chloride in 5 ml. of anhydrous acetonitrile is vigorously stirred at 80° C. for 15 minutes, then cooled to room temperature and poured into 75 ml. of ethyl ether. The mixture is then centrifuged and the supernatant liquid discarded. The solid product is then washed in 50 ml. of ethyl ether and centrifuged. The resulting washed solid is dissolved in 5 ml. of water. 5 ml. of concentrated ammonia solution is then added to this solution and the mixture stored overnight at room temperature. The mixture is then evaporated in vacuo and the resulting residue is dissolved in 10 ml. of 30% aqueous methanol and applied to a column of Dowex AG 1–X2 (OH⁻ form) packed in 30% aqueous methanol. The column is then first eluted with 30% aqueous methanol and then with a mixture of 30% aqueous methanol and aqueous .1M triethylammonium bicarbonate solution (volume ratio 100:35) until the product is eluted from the column. The combined fractions containing the 1-β-D-arabinofuranosylcytosine products are evaporated to dryness in vacuum and repeatedly coevaporated with methanol to remove residual salt. The product is then further purified by crystallization from 3 ml. of methanol-acetone.

The following 1-β-D-arabinofuranosylcytosine derivatives are respectively prepared by following the above procedure using the corresponding cytidine derivatives enumerated in Example 1 as starting materials:

1-(5'-chloro-5'deoxy-β-D-arabinofuranosyl)-cytosine;
1-(5'-deoxy-5'-fluoro-β-D-arabinofuranosyl)-cytosine;
1-(5'-bromo-5'-deoxy-β-D-arabinofuranosyl)-cytosine;
1-(5'-deoxy-5'-iodo-β-D-arabinofuranosyl)-cytosine;
1-(5'-methoxy-β-D-arabinofuranosyl)-cytosine;
1-(5'-amino-5'-deoxy-β-D-arabinofuranosyl)-cytosine;
1-(5'-deoxy-5'-methylamino-β-D-arabinofuranosyl)-cytosine;
1-(5'-azido-5'-deoxy-β-D-arabinofuranosyl)-cytosine;
$N^4$-methyl-1-(β-D-arabinofuranosyl)-cytosine;
$N^4$-dimethyl-1-(β-D-arabinofuranosyl)-cytosine;
$N^4$-phenyl-1-(β-D-arabinofuranosyl)-cytosine;
5-methyl-1-(β-D-arabinofuranosyl)-cytosine;
5-hydroxymethyl-1-(β-D-arabinofuranosyl)-cytosine;
5-nitro-1-(β-D-arabinofuranosyl)-cytosine;
5-amino-1-(β-D-arabinofuranosyl)-cytosine;
5-nitro-1-(5'-azido-5'-deoxy-β-D-arabinofuranosyl)-cytosine;
1-(β-D-arabinofuranosyl)-6-azacytidine;
5-methyl-1-(β-D-arabinofuranosyl)-6-azacytidine;
1-(5'-chloro-5'-deoxy-β-D-arabinofuranosyl)-6-azacytidine;
1-(5'-bromo-5'-deoxy-β-D-arabinofuranosyl)-6-azacytidine;
$N^4$-methyl-1-(β-D-arabinofuranosyl)-6-azacytidine;
$N^4$-dimethyl-1-(β-D-arabinofuranosyl)-6-azacytidine;
1-(β-D-arabinofuranosyl)-5-azacytidine;
1-(5'-chloro-5'-deoxy-β-D-arabinofuranosyl)-5-azacytidine;
1-(5'-bromo-5'-deoxy-β-D-arabinofuranosyl)-5-azacytidine;
$N^4$-methyl-1-(β-D-arabinofuranosyl)-5-azacytidine;
$N^4$-dimethyl-1-(β-D-arabinofuranosyl)-5-azacytidine.

In instances where the above compounds are not easily crystallized from methanol-acetone, the product is readily crystallized as its hydrochloride salt by the addition of a small excess of concentrated hydrochloride acid to a methanol solution of the product followed by the gradual addition of acetone.

EXAMPLE 9

This example illustrates the preparation of the same arabinofuranosyl compounds as prepared in Example 7 but by the use of an α - acyloxy - acid bromide. In this example, a mixture containing 243 mg. of cytidine and 836 mg. of 2 - acetoxy - 2 - methylpropionyl bromide in 5 ml. of anhydrous acetonitrile is vigorously stirred at 20° C. for 30 minutes, and then poured into 75 ml. of ethyl ether. The mixture is centrifuged and the supernatant liquid discarded. The resulting solid residue is washed with 50 ml. of ethyl ether and centrifuged. The resulting solid residue is then dissolved in 5 ml. of water and 5 ml. of concentrated aqueous ammonia solution is added to the above solution and mixture stored overnight at room temperature. The solution is then evaporated in vacuo and the resulting product residue dissolved in 10 ml. of aqueous 30% methanol solution and then applied to a column of Dowex AG 1–X2 (OH⁻ form) packed in aqueous 30% methanol. The column is first eluted with aqueous 30% methanol and then with a mixture of 30% aqueous methanol and aqueous 0.1 M-triethylammonia bicarbonate solution (volume ratio 100:35) until the product is eluted from the column. The combined fractions containing the product are then evaporated to dryness in vacuo and washed by repeated coevaporations with methanol to remove residual salts. The resulting 1 - β - D - arabinofuranosyl - cytosine product is further purified by crystallization from methanol-acetone or where more expedient by first converting the product to its hydrochloride salt as described in Example 8.

The remaining compounds of Example 7 are respectively prepared by following the above procedure using the corresponding cytidine derivatives as starting materials.

EXAMPLE 10

This example illustrates the preparation of the same arabinofuranosyl compounds as prepared in Example 7 from the corresponding fluoride compounds of our invention prepared according to Example 3. In this example 300 mg. of 3' - O - acetyl - $O^2$,2' - cyclocytidine hydrofluoride is dissolved in 5 ml. of water. 5 ml. of cencentrated aqueous ammonia solution is added to the above solution and the mixture stored overnight at room temperature. The solution is then evaporated in vacuo and the resulting product residue dissolved in 10 ml. of aqueous 30% methanol solution and then applied to a column of Dowex AG 1–X2 (OH⁻) form packed in aqueous 30% methanol. The column is first eluted with aqueous 30% methanol and then with a mixture of aqueous 30% methanol and 0.1 M-triethyl-ammonia bicarbonate solution (volume ratio 100:35) until the product is eluted from the column. The combined fractions containing the product are then evaporated to dryness in vacuo and washed by repeated coevaporations with methanol to remove residual salts. The resulting 1 - $\beta$ - D - arabinofuranosyl cytosine product is further purified by crystallization from methanol-acetone.

The remaining compounds of Example 8 are respectively prepared by following the above procedure using the corresponding cyclocytidine hydrofluoride salts as starting materials.

EXAMPLE 11

This example illustrates the preparation of the same arabinofuranosyl compounds as prepared in Example 7 by the use of an $\alpha$ - acyloxy - acid iodide. In this example, a mixture containing 243 mg. of cytidine and 1024 mg. of 2 - acetoxy - 2 - methylpropionyl iodide in 5 ml. of anhydrous acetonitrile is vigorously stirred at 30° C. for 1 hour, then cooled to room temperature and poured into 75 ml. of ethyl ether. The mixture is centrifuged and the supernatant liquid discarded. The resulting solid residue is washed with 50 ml. of ethyl ether and centrifuged. The resulting solid residue is then dissolved in 5 ml. of water and 5 ml. of concentrated aqueous ammonia solution added to the above solution and mixture stored overnight at room temperature. The solution is then evaporated in vacuo and the resulting product residue dissolved in 10 ml. of aqueous 30% methanol solution and then applied to a column of Dowex AG 1–X2 (OH⁻ form) packed in aqueous 30% methanol. The column is first eluted with aqueous 30% methanol and then with a mixture of aqueous 30% methanol and aqueous 0.1 M-triethylammonia bicarbonate solution (volume ratio 100:35) until the product is eluted from the column. The combined fractions containing the product are then evaporated to dryness in vacuo and washed by repeated coevaporations with methanol to remove residual salts. The resulting 1 - $\beta$ - D - arabinofuranosyl - cytosine product is further purified by crystallization from methanol.

The remaining compounds of Example 9 are respectively prepared by following the above procedure using the corresponding cytidine derivatives as starting materials.

EXAMPLE 12

This example illustrates the preparation of the same arabinofuranosyl compounds as prepared in Example 10 but by the use of a 2 - benzoyloxy - 2 - methylpropionyl chloride. In this example, a mixture containing 243 mg. of cytidine and 908 mg. of 2 - benzoyloxy - 2 - methylpropionyl chloride in 5 ml. of anhydrous acetonitrile is vigorously stirred at 80° C. for 1 hour, then cooled to room temperature and poured into 75 ml. of ethyl ether. The mixture is centrifuged and the supernatant liquid discarded. The resulting solid residue is washed with 50 ml. of ethyl ether and centrifuged. The resulting solid residue is then dissolved in 5 ml. of water and 5 ml. of concentrated aqueous ammonia solution added to the above solution and mixture stored overnight at 50° C. The solution is then evaporated in vacuo and the resulting product residue dissolved in 10 ml. of aqueous 30% methanol solution and then applied to a column of Dowex AG 1–X2 (OH⁻ form) packed in aqueous 30% methanol. The column is first eluted with aqueous 30% methanol and then with a mixture of aqueous 30% methanol and aqueous 0.1 M-triethylammonia bicarbonate solution (volume ratio 100:35) until the product is eluted from the column. The combined fractions containing the product are then evaporated to dryness in vacuo and washed by repeated coevaporations with methanol to remove residual salts. The resulting 1 - $\beta$ - D - arabinofuranosyl cytosine product is further purified by crystallization from methanol-acetone.

The remaining compounds of Example 10 are respectively prepared by following the above procedure using the corresponding cytidine derivatives as starting materials.

EXAMPLE 13

This example illustrates a method, according to our invention, of preparing the (S) 2,2'-anhydro-1-(3'-O-acyl-$\beta$-D-arabinofuranosyl)-2-thiocytosine halo salts of our invention. In this example a mixture containing 2.5 grams of 2-thiocytidine and 6.6 g. of $\alpha$-acetoxyisobutyryl chloride in 50 ml. of acetonitrile is heated at 80° C. for 30 minutes. The acetonitrile solvent is then evaporated in vacuo and the resulting residue is partitioned between water and ether. The water solution is then evaporated affording a residue of crude (S) 2,2'-anhydro-1-(3'-O-acetyl - $\beta$ - D-arabinofuranosyl)-2-thiocytosine hydrochloride which is further purified by recrystallization from methanol:acetone.

In a like manner, 2-thiocytidine is reacted, respectively, with $\alpha$-butyroxyisobutyryl chloride; $\alpha$-benzoyloxyisobutyryl chloride; $\alpha$-acetoxyisobutyryl bromide; $\alpha$-butyryloxyisobutyrylbromide; and $\alpha$-benzoyloxyisobutyryl bromide to form the corresponding 3'-O-acyl derivatives of (S) 2,2'-anhydro - 1 - ($\beta$-D-arabinofuranosyl)-2-thiocytosine hydrochloride salts and hydrobromide salts, respectively.

EXAMPLE 14

This example illustrates a method according to our invention of preparing the fluoride, iodide, and other pharmaceutically acceptable (S) 2,2'-anhydro-1-(3'-O-acyl-$\beta$-D-arabinofuranosyl)-2-thiocytidine salts of our invention. In this example 20 ml. of an aqueous solution containing 1 gram of (S) 2,2'-anhydro-1-(3'-O-acetyl-$\beta$-D-arabinofuranosyl)-2-thiocytidine hydrochloride is passed through a column containing 50 ml. of a quaternary ammonium ion exchange resin (i.e. Dowex (−1)) in the fluoride salt forms. The resulting effluent and water washes thereof are combined and evaporated to dryness. The resulting residue is then recrystallized from methanol, by the addition of acetone, affording (S) 2,2'-anhydro-1-(3'-O-acetyl-$\beta$-D-arabinofuranosyl)-2-thiocytosine hydrofluoride.

By following the above procedure using the corresponding chloride and bromide salt compounds enumerated in Example 13, the corresponding hydrofluoride salts are prepared.

By following the above procedure but using, respectively, iodide; sulfate; phosphate; acetate and lactate salt forms of the exchange resin and the hydrochloride and hydrobromide salt products enumerated in Example 13, the corresponding hydroiodide; sulfate; phosphate; acetate and lactate salts of these compounds are, respectively, prepared.

EXAMPLE 15

This example illustrates a method according to our invention of preparing the 1-(2-thio-$\beta$-D-arabinofuranosyl)-cytosine compounds of our invention. In this example a solution containing 500 mg. of (S) 2,2'-anhydro-1-(3'-O-acetyl-$\beta$-D-arabinofuranosyl)-2-thiocytosine in 5 ml. of methanol is mixed with 5 ml. of concentrated ammonium hydroxide and allowed to stand overnight under a nitrogen atmosphere at room temperature. The solvent is then evaporated and the resulting residue is dissolved in 5 ml. of 30% aqueous methanol containing 1% 2-mercaptoethanol and the solution applied to a column of Dowex AG–1 (X2) resin in the hydroxide form. The column is then first eluted with 30% aqueous methanol and then with a gradient of triethylammonium bicarbonate in 30% methanol containing 1% 2-mercaptoethanol. The product fractions are evaporated to dryness, then coevaporated several times with methanol to remove excess bicarbonate and then redissolved in 20 ml. of methanol. For convenience, the 1-(2-thio-$\beta$-D-arabinofuranosyl)-cytidine product is then precipitated as its hydrochloride salt by the addition of a slight excess of concentrated hydrochloric acid which affords a precipitate of 1-(2-thio-β-D-arabinofuranosyl)-cytidine hydrochloride. The precipitate is then divided into two portions. One portion is further purified by recrystallization from methanol-acetone to afford the purified hydrochloride salt; and the second portion is converted to the free-base via treatment with a dilute aqueous ammonium hydroxide solution.

By following the same procedure, 1-(2-thio-β-D-arabinofuranosyl)-cytosine is also prepared from the hydrochloride salt products and hydrobromide salt products prepared according to Example 13.

EXAMPLE 16

This example illustrates a method of preparing N⁴-lower alkyl-5-azacytidines according to the procedure described in Coll. Czech. Chem. Comm., 29, 2060 (1964). In this example 3.85 grams of 1-(2,3,5-tri-O-acetyl-β-D-arabinofuranosyl) - 4 - methoxy - 2-oxo-1,2-dihydro-1,3,5-triazine is added to 30 ml. of a methanol solution containing 2 g. of anhydrous methylamine and the resulting mixture is maintained at 30° C. for 1 hour. The solvent is then evaporated in vacuo and the residue crystallized from methanol affording N⁴-methyl-5-azacytidine.

By carefully following the above procedure using other lower alkylamines in place of methylamine (e.g. ethylamine, dimethylamine) the corresponding N⁴-lower alkyl-5-azacytidine compounds can be prepared.

EXAMPLE 17

This example illustrates a method of preparing 5'-deoxy-5'-halo-5-azacytidine and -6-azacytidine starting materials. In this example 0.5 ml. of acetic anhydride is added to a stirred refluxing solution of 2 mmoles of 5-azacytidine in 50 ml. of methanol. During the reflux period, five additional 0.5 ml. portions of acetic anhydride are made hourly. After the final addition, the resultant solution is refluxed for one additional hour. It is then cooled and concentrated under reduced pressure at 30° C. to about 10 ml. volume. Ether is added until the solution is faintly turbid and the mixture is left overnight at 5° C. The resulting crystals are removed by filtration and washed with ether, affording N⁴-acetyl-5-azacytidine. By following the same procedure using 6-azacytidine, in place of 5-azacytidine, N⁴-acetyl-6-azacytidine is prepared.

The N⁴-acetyl-5-azacytidine product (1 mmole) is dissolved in 10 ml. of dimethylformamide containing 1 mmole of triphenylphosphine. Carbon tetrachloride (1.1 mmole) is added to the solution and the resulting mixture is allowed to stand for 24 hours at 20° C. and then quenched by the addition of methanol. The solvents are evaporated to dryness and the resulting crude syrup is purified by preparative thin layer chromatography (carbon tetrachloride:acetone; 6:4) providing N⁴-acetyl-5'-chloro-5'-deoxy-5-azacytidine, which is further purified by recrystallization from chloroform:n-hexane. By following the above procedure using N⁴-acetyl-6-azacytidine (in place of N⁴-acetyl-5-azacytidine), N⁴-acetyl-5'-chloro-5'-deoxy-6-azacytidine is prepared. Similarly, by following the above procedures using carbon tetrabromide, in place of carbon tetrachloride, N⁴-acetyl-5'-bromo-5'-deoxy-5-azacytidine and N⁴-acetyl-5'-bromo-5'-deoxy - 6 - azacytidine are also prepared.

The above products are then deacylated by treatment with a mixture of methanol and aqueous ammonium hydroxide at room temperature (20° C.) for 24 hours affording 5'-chloro-5'-deoxy-5-azacytidine; 5'-chloro-5'-deoxy-6-azacytidine; 5'-bromo-5'-deoxy-5-azacytidine; and 5'-bromo-5'-deoxy-6-azacytidine, respectively.

Obviously, many modifications and variations of the invention, described hereinabove and in the claims, can be made without departing from the essence and scope thereof.

What is claimed is:
1. A compound having the formula:

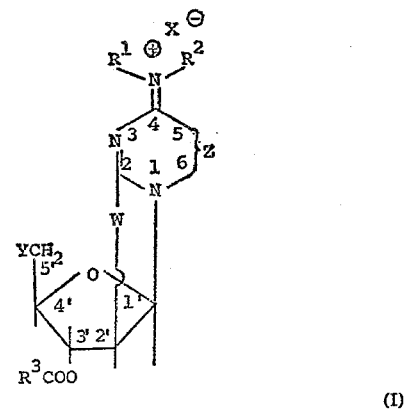

(I)

wherein R¹ and R² are independently selected from the group consisting of H, lower alkyl, aryl and lower alkylaryl; R³ is selected from the group consisting of lower alkyl, aryl, lower alkylaryl, cycloalkyl, and saturated and unsaturated heterocyclic hydrocarbons having from 3 to 10 ring atoms; X is a pharmaceutically acceptable anion; Y is selected from the group consisting of H, hydroxy, halo, lower acyloxy, benzoyloxy, amino, lower alkylamino, and azido; Z is selected from the group consisting of

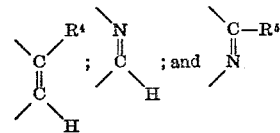

wherein R⁴ is selected from the group consisting of H, halo, lower alkyl, lower hydroxyalkyl, lower alkylhalide, azido, nitro, amino, lower alkylamino, and acylamido, and R⁵ is selected from the group consisting of H and methyl; and wherein when Z is

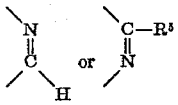

Y is selected from the group consisting of hydroxy, chloride, and bromide and R¹ and R² are independently selected from the group consisting of H and lower alkyl; and W is selected from the group consisting of oxa and thia and wherein when W is thia, R¹ and R² are H, Y is hydroxy and Z is the group

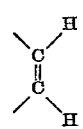

2. The compound of claim 1 wherein R⁴ is selected from the group consisting of H, lower alkyl, lower hydroxyalkyl, lower alkylhalide, azido, nitro, amino, lower alkylamino, and acylamido.

3. The compound of claim 1 wherein X is selected from the group of pharmaceutically acceptable anions consisting of halide anions, sulfate anions, phosphate anions, acetate anions and lactate anions.

4. The compound of claim 3 wherein X is selected from the group of halide anions consisting of chloride anions and bromide anions.

5. The compound of claim 1 having the formula:

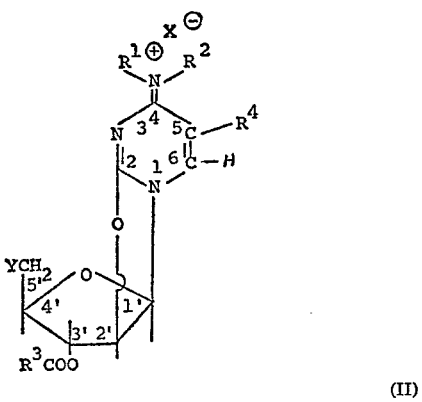

(II)

wherein R, $R^1$, $R^2$, $R^3$, $R^4$, and Y are as defined in claim 1.

6. The compound of claim 5 wherein Y is selected from the group consisting of H, hydroxy, halo, lower alkoxy, amino, lower alkylamino, and azido.

7. The compound of claim 5 wherein said compound is selected from the group consisting of 3'-O-acetyl-$O^2$,2'-cyclocytidine hydrochloride; 3'-O-butyryl-$O^2$,2'-cyclocytidine hydrochloride and 3'-O-acetyl-$O^2$,2'-cyclo-5-fluorocytidine hydrochloride.

8. The compound of claim 1 having the formula:

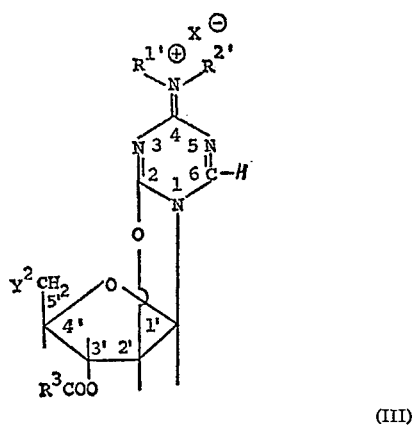

(III)

wherein $R^{1'}$ and $R^{2'}$ are independently selected from the group consisting of H and lower alkyl; $Y^2$ is selected from the group consisting of hydroxy, chloride, and bromide; and $R^3$ is as defined in claim 1.

9. The compound of claim 8 wherein said compound is 3'-O-acetyl-$O^2$, 2'-cyclo-5-azacytidine hydrochloride.

10. The compound of claim 1 having the formula:

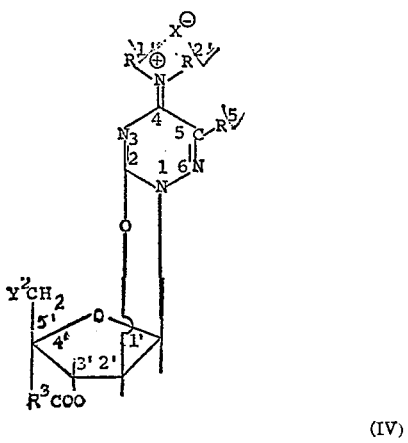

(IV)

wherein $R^{1'}$ and $R^{2'}$ are independently selected from the group consisting of H and lower alkyl; $Y^2$ is selected from the group consisting of hydroxy, chloride, and bromide; and $R^3$ and $R^5$ are as defined in claim 1.

11. The compound of claim 10 wherein said compound is 3'-O-acetyl-$O^2$,2'-cyclo-6-azacytidine hydrochloride.

12. The compound of claim 1 wherein said compound has the formula:

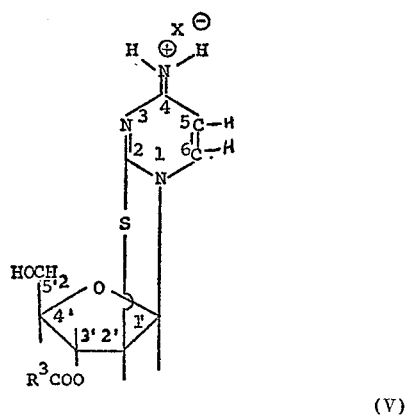

(V)

wherein $R^3$ and X are as defined in claim 1.

13. A compound having the formula:

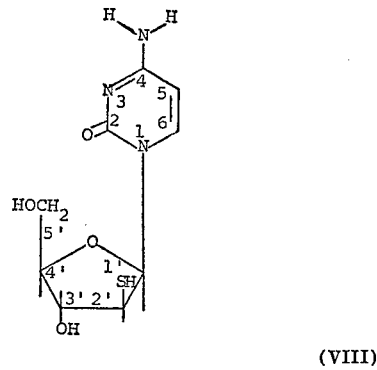

(VIII)

and pharmaceutically acceptable salts thereof.

14. The compound of claim 13 wherein said pharmaceutically acceptable salt is selected from the group consisting of halide, sulfate, phosphate, acetate and lactate salts.

15. A process for preparing the cyclocytidine compound of claim 1, which comprises the steps of treating a cytidine compound selected from the group consisting of cytidine, 5-azacytidine, 6-azacytidine, 2-thiocytidine and derivatives thereof, with an α-acyloxy acyl halide having the formula:

(B)

wherein $R^3$ is as defined in claim 1; X' is selected from the group consisting of chloride, bromide, and iodide; and $R^6$ and $R^7$ are independently selected from the group consisting of lower alkyl, aryl, and alkylaryl; and wherein when one of $R^6$ and $R^7$ is aryl or alkylaryl, the other can be H under reactive conditions, thereby following a product mixture containing the corresponding compound of claim 1, and isolating and recovering said compound of claim 1 from the product mixture.

16. The process of claim 15 wherein said cytidine compound is selected from the group of compounds having the formula:

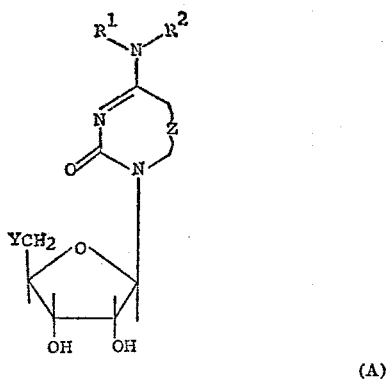

(A)

wherein R¹ and R² are independently selected from the group consisting of H, lower alkyl, aryl and lower alkylaryl; Y is selected from the group consisting of H, hydroxy, halo, aryloxy, lower alkoxy, lower acyloxy, amino, lower alkylamino, or azido; and Z is the group

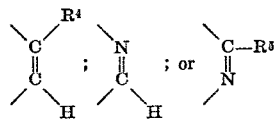

wherein R⁴ is selected from the group consisting of H, halo, lower alkyl, lower alkylhydroxy, lower alkylhalide, azido, nitro, amino, lower alkylamino, and acylamido; and R⁵ is selected from the group consisting of H and methyl and wherein when Z is

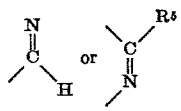

Y is selected from the group consisting of hydroxy, chloride and bromide, and R¹ and R² are independently selected from the group consisting of H and lower alkyl.

17. The process of claim 15 wherein said cytidine compound is 2-thiocytidine and has the formula:

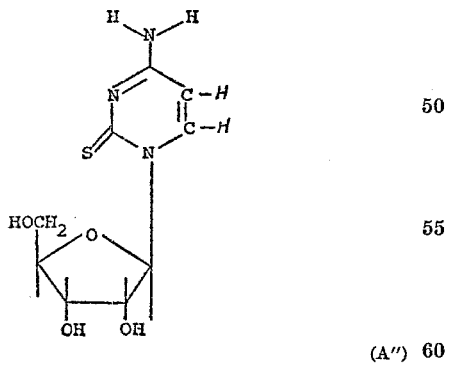

(A'')

18. The process of claim 15 wherein said treatment is conducted in an inert organic solvent at temperatures in the range of about from 0 to 150° C. for about from 5 minutes to 10 hours.

19. The process of claim 18 wherein said inert organic solvent is acetonitrile.

20. The process of claim 15 wherein said α-acyloxy acyl halide is selected from the group consisting of α-acyloxy acyl chlorides and α-acyloxy acyl bromides thereby affording the corresponding halide salt compound.

21. The process of claim 20 wherein said halide salt is ion exchanged with a pharmaceutically acceptable anion thereby affording the corresponding pharmaceutically acceptable salt.

22. The process of claim 21 wherein said pharmaceutically acceptable anion is selected from the group consisting of fluoride anions, iodide anions, sulfate anions, phosphate anions, acetate anions, lactate anions and mixtures thereof.

23. A process for preparing 1β,D-arabinofuranosylcytosine compounds having the formula:

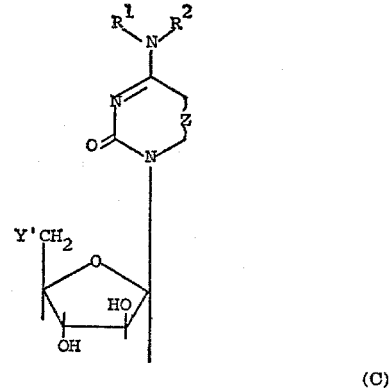

(C)

wherein R¹ and R² are independently selected from the group consisting of H, lower alkyl, aryl and lower alkylaryl; Y' is selected from the group consisting of H, hydroxy, halo, lower alkoxy, amino, lower alkylamino and azido; and Z is the group

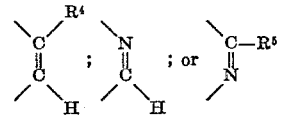

wherein R⁴ is selected from the group consisting of H, lower alkyl, lower hydroxyalkyl, lower alkylhalide, azido, amino, lower alkylamino, and acylamido; and R⁵ is H or methyl and wherein when Z is

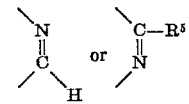

Y' is selected from the group consisting of hydroxy, chloride and bromide and R¹ and R² are independently H or lower alkyl which comprises the steps of:

(a) treating a cytidine compound having the formula:

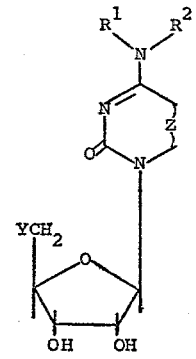

(A')

wherein R¹, R², and Z are as defined above and Y is selected from the group consisting of H, hydroxy, lower alkoxy, aryloxy, lower acyloxy, amino, lower alkylamino and azido, with an α-acyloxy halide having the formula:

(B)

wherein R³ is selected from the group consisting of lower alkyl, aryl, lower alkylaryl, cycloalkyl, and saturated and unsaturated heterocyclic hydrocarbons having from 3 to 10 ring atoms; X' is selected from the group consisting of chloride, bromide, and iodide, and R⁶ and R⁷ are independently selected from the group consisting of lower alkyl, aryl, and alkylaryl; and wherein when one of R⁶ or R⁷ is aryl or alkylaryl, the other can be H under reactive conditions, thereby affording a product mixture containing the corresponding 3'-O-acyl-O²,2'-cyclocytidine compound;

(b) separating and isolating said 3'-O-acyl-O²,2'-cyclocytidine compound from said product mixture; and (c) treating said cyclocytidine compound with an alkaline solution under reactive conditions thereby affording the corresponding 1-(β-D-arabinofuranosyl) cytosine compounds.

24. A process for preparing the compound of Formula VIII of claim 13 which comprises the steps of:

(a) treating a cytidine compound having the formula:

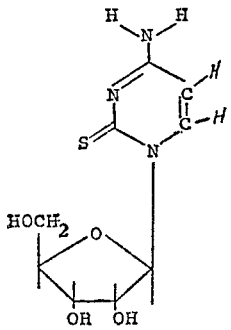

(A'')

wherein R³ is selected from the group consisting of lower alkyl, aryl, lower alkylaryl, cycloalkyl, and saturated and unsaturated heterocyclic hydrocarbons having from 3 to 10 ring atoms;

with an α-acyloxy halide having the formula:

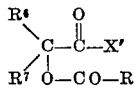

(B)

wherein R³ is selected from the group consisting of lower alkyl, aryl, lower alkylaryl, cycloalkyl, and saturated and unsaturated heterocyclic hydrocarbons having from 3 to 10 ring atoms; X' is selected from the group consisting of chloride, bromide, and iodide, and R⁶ and R⁷ are independently selected from the group consisting of lower alkyl, aryl, and alkylaryl; and wherein when one of R⁶ or R⁷ is aryl or alkylaryl, the other can be H;

under reactive conditions, thereby affording the corresponding (S) 2,2'-anhydro-1-(3'-O-acyl - β - D-arabinofuranosyl)-2-thiocytosine compound; and (b) treating said (S) 2,2'-anhydro-1-(3'-O-acyl-β-D-arabinofuranosyl)-2-thiocytosine compound with an alkaline solution under reactive conditions thereby affording the corresponding 1-(2-thio-β-D-arabinofuranosyl) cytosine compounds.

25. The process of claim 24 wherein said cyclocytidine compounds of step (a) are isolated prior to said treatment of step (b).

26. The process of claim 24 wherein said α-acyloxy acyl halide is selected from the group consisting of α-acyloxy acyl chloride and α-acyloxy acyl bromide.

27. The process of claim 24 wherein step (a) is conducted in an inert solvent at temperatures in the range of about from 0 to 150° C. for about from 5 minutes to 10 hours.

28. The process of claim 27 wherein said inert organic solvent is acetonitrile.

29. The process of claim 27 wherein step (b) is conducted at a temperature in the range of about from 0° to 100° C. for about from 1 to 24 hours with sufficient alkali solution of sufficient strength to maintain a pH in the range of about from 10 to 14.

30. A process for preparing the compound of Formula VIII of claim 13 which comprises treating a compound having the formula:

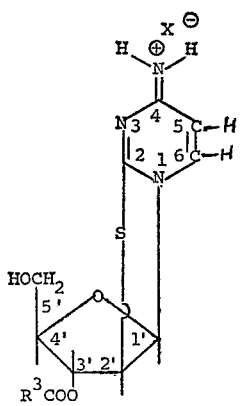

wherein X is halo; and R³ is selected from the group consisting of lower alkyl, aryl, lower alkylaryl, cycloalkyl, and saturated and unsaturated heterocyclic hydrocarbons having from 3 to 10 ring atoms, with an alkaline solution, provided in sufficient quantity and concentration to maintain a pH in the range of about from 10 to 14, for about from 1 to 24 hours at temperatures in the range of about from 0° to 100° C. thereby affording said compound of Formula VIII.

References Cited

UNITED STATES PATENTS

| 3,282,921 | 11/1966 | Verheyden et al. | 260—211.5 R |
| 3,350,388 | 10/1967 | Sorm et al. | 260—211.5 R |
| 3,463,850 | 8/1969 | Shen et al. | 260—211.5 R |
| 3,539,550 | 11/1970 | Greenberg et al. | 260—211.5 R |

LEWIS GOTTS, Primary Examiner

J. R. BROWN, Assistant Examiner

U.S. Cl. X.R.

260—999